(12) United States Patent
Nashiki et al.

(10) Patent No.: US 9,223,165 B2
(45) Date of Patent: Dec. 29, 2015

(54) DISPLAY PANEL DEVICE WITH TOUCH INPUT FUNCTION, OPTICAL UNIT FOR SAID DISPLAY PANEL DEVICE, AND PRODUCTION METHOD FOR SAME

(75) Inventors: Tomotake Nashiki, Ibaraki (JP); Daisuke Kajihara, Ibaraki (JP); Hideo Sugawara, Ibaraki (JP); Tsuyoshi Chiba, Ibaraki (JP); Hiroaki Kishioka, Ibaraki (JP); Mayumi Kishioka, legal representative, Toyohashi (JP); Tomohide Banba, Ibaraki (JP); Masahiro Ooura, Ibaraki (JP)

(73) Assignee: NITTO DENKO CORPORATION, Ibaraki-Shi, Osaka (JP)

( * ) Notice: Subject to any disclaimer, the term of this patent is extended or adjusted under 35 U.S.C. 154(b) by 76 days.

(21) Appl. No.: 13/881,958

(22) PCT Filed: Oct. 27, 2011

(86) PCT No.: PCT/JP2011/074756
§ 371 (c)(1),
(2), (4) Date: Jun. 5, 2013

(87) PCT Pub. No.: WO2012/057244
PCT Pub. Date: May 3, 2012

(65) Prior Publication Data
US 2014/0071353 A1    Mar. 13, 2014

(30) Foreign Application Priority Data
Oct. 27, 2010  (JP) ................................. 2010-241160

(51) Int. Cl.
G02F 1/1335    (2006.01)
G02F 1/1333    (2006.01)
(Continued)

(52) U.S. Cl.
CPC ............ *G02F 1/13338* (2013.01); *G06F 3/041* (2013.01); *G06F 3/044* (2013.01); *G06F 2203/04103* (2013.01); *Y10T 156/1062* (2015.01)

(58) Field of Classification Search
CPC ... G02F 1/13338; G02F 3/041; G02F 3/0412; G02F 3/044; G02F 2203/04103
USPC ...................... 349/12, 158, 187; 345/173, 174
See application file for complete search history.

(56) References Cited

U.S. PATENT DOCUMENTS 8,094,134 B2    1/2012   Suzuki et al.
8,248,558 B2    8/2012   Kimura et al.
(Continued)

FOREIGN PATENT DOCUMENTS

CN    1403856 A      3/2003
CN    101057210 A    10/2007
(Continued)

OTHER PUBLICATIONS

Japanese Office Action for application No. 2010-241160 dated Dec. 11, 2013.
(Continued)

*Primary Examiner* — Nathaniel R Briggs
(74) *Attorney, Agent, or Firm* — Hauptman Ham, LLP

(57) ABSTRACT

Provided is an optical unit for a display panel device with a capacitive touch input function. In the optical unit, a touch panel laminate comprises: an optically transparent first substrate layer laminated to one surface of a transparent adhesive layer; a first transparent electrically conductive layer laminated, through a first undercoat layer, to a surface of the first substrate layer on a side opposite to the adhesive layer; an optically transparent second substrate layer laminated to the other surface of the adhesive layer; and a second transparent electrically conductive layer laminated, through a second undercoat layer, to a surface of the second substrate layer on a side opposite side to the adhesive layer.

12 Claims, 14 Drawing Sheets

(51) Int. Cl.
*G02F 1/13* (2006.01)
*G06F 3/041* (2006.01)
*G06F 3/045* (2006.01)
*G06F 3/044* (2006.01)

(56) References Cited

U.S. PATENT DOCUMENTS

| | | |
|---|---|---|
| 8,259,263 B2 | 9/2012 | Kimura et al. |
| 8,277,587 B2 | 10/2012 | Kimura et al. |
| 8,404,334 B2 | 3/2013 | Kimura et al. |
| 8,491,737 B2 | 7/2013 | Kimura et al. |
| 8,657,976 B2 | 2/2014 | Kimura et al. |
| 2001/0036553 A1 | 11/2001 | Satake et al. |
| 2003/0052869 A1 | 3/2003 | Fujii et al. |
| 2004/0129381 A1 | 7/2004 | Satake et al. |
| 2007/0224412 A1 | 9/2007 | Hara et al. |
| 2008/0138589 A1 | 6/2008 | Wakabayashi et al. |
| 2008/0165158 A1 | 7/2008 | Hotelling et al. |
| 2008/0176042 A1* | 7/2008 | Nashiki et al. ............... 428/172 |
| 2009/0160819 A1* | 6/2009 | Sasaki et al. ............... 345/174 |
| 2010/0283943 A1 | 11/2010 | Kimura et al. |
| 2010/0288420 A1* | 11/2010 | Kimura et al. ............... 156/64 |
| 2010/0316817 A1 | 12/2010 | Kimura et al. |
| 2011/0115738 A1 | 5/2011 | Suzuki et al. |
| 2011/0135892 A1 | 6/2011 | Nashiki et al. |
| 2011/0141059 A1 | 6/2011 | Nashiki et al. |
| 2011/0143105 A1 | 6/2011 | Nashiki et al. |
| 2011/0147340 A1 | 6/2011 | Nashiki et al. |
| 2012/0160420 A1 | 6/2012 | Kimura et al. |
| 2012/0180930 A1 | 7/2012 | Kimura et al. |
| 2012/0211167 A1 | 8/2012 | Kimura et al. |
| 2012/0216937 A1 | 8/2012 | Kimura et al. |

FOREIGN PATENT DOCUMENTS

| | | |
|---|---|---|
| CN | 101226450 A | 7/2008 |
| JP | H1166996 A | 3/1999 |
| JP | 2001030409 | 2/2001 |
| JP | 2001272539 | 5/2001 |
| JP | 2002040243 | 2/2002 |
| JP | 2002055780 | 2/2002 |
| JP | 2002-148592 A | 5/2002 |
| JP | 2002156920 | 5/2002 |
| JP | 2005179481 | 7/2005 |
| JP | 2009-061498 A | 3/2009 |
| JP | 2009076432 | 4/2009 |
| JP | 4377964 B1 | 12/2009 |
| JP | 2010515969 | 5/2010 |
| JP | 2010198103 | 9/2010 |
| JP | 2010217770 | 9/2010 |
| KR | 20070054661 A | 5/2007 |
| TW | 201005372 A | 2/2010 |
| TW | 201030575 A | 8/2010 |
| WO | 2006019184 | 2/2006 |
| WO | 2006028131 | 3/2006 |
| WO | 2006126604 | 11/2006 |
| WO | 2009128115 | 10/2009 |
| WO | 2010074116 | 7/2010 |
| WO | 2010/095797 A | 8/2010 |

OTHER PUBLICATIONS

Korean Office Action for application 10-2013-7012591 dated Mar. 31, 2014.
Japanese Office Action for application 2014-047248 dated Dec. 3, 2014.
International Search Report mailed Feb. 7, 2012 for PCT/JP2011/074756.
Japanese Office Action for 2010-241160 dated Mar. 7, 2013.
Written Opinion of the International Searching Authority for PCT/JP2011/074756.
Chinese Office Action mailed May 22, 2015 for corresponding Chinese Application No. 201180063105.6.
Taiwanese Office Action for application No. 100139166 dated Aug. 27, 2015.
Japanese Office Action for Application No. 2010-241160(Appeal No. 2014-4669) dated Feb. 25, 2015.

* cited by examiner

DISPLAY PANEL DEVICE WITH TOUCH INPUT FUNCTION, OPTICAL UNIT FOR SAID DISPLAY PANEL DEVICE, AND PRODUCTION METHOD FOR SAME

TECHNICAL FIELD

The present invention relates to a display panel device having a touch input function, an optical unit comprising a touch input functional section and constituting the display panel device, and production methods for them. In particular, the present invention relates to a display panel device and an optical unit each having a capacitive touch input function, and production methods for them.

BACKGROUND ART

A display panel device equipped with a touch panel for touch input is disclosed in a large number of documents. For example, JP 2002-040243 A (Patent Document 1), JP 2002-055780 A (Patent Document 2) and JP 2002-156920 A (Patent Document 3) disclose a display panel device in which a touch panel for touch input is disposed on an upper side of a display panel board. All of the touch panels described in the Patent Documents 1 to 3 are a resistive type in which two transparent electrodes are disposed in a spaced-apart and opposed relation, wherein one of the transparent electrodes disposed on a viewing side of the display panel device is adapted to be pressed and brought into contact with the other transparent electrode, thereby allowing a tough input to be sensed. In the Patent Documents 1 to 3, there is an air gap between the two electrodes, which leads to a problem that reflected light in surfaces of the electrodes is transmitted to the viewing side of the optical display devices, causing deterioration in display quality. In order to cope with this problem of internal reflection, the Patent Documents 1 to 3 teach arranging a circular polarization element on the viewing side with respect to the touch panel. Specifically, the Patent Documents 1 to 3 propose to arrange a linear polarization layer and a ¼ λ phase difference layer in this order from the viewing side of the display panel, and arrange the touch panel on a lower side of the ¼ λ phase difference layer. The Patent Document 1 discloses a configuration in which a touch panel is combined with a reflective liquid crystal display device, and the Patent Document 2 mentions applicability to both a liquid crystal display device and an organic EL display device. Further, the Patent Document 3 offers an example of an organic EL display device.

JP 2010-198103 A (Patent Document 4) discloses a capacitive touch input device. A touch sensor described in the Patent Document 4 comprises two patterned electrically conductive layers each provided on a respective one of opposite sides of a substrate film formed as a single body. A touch sensor having a similar laminate configuration is described in FIG. 5 of JP 2009-076432 A (Patent Document 5). The Patent Document 5 further describes, in FIG. 7 thereof, a double-electrode type touch sensor prepared by forming a transparent electrode layer on one surface of a film substrate through an undercoat layer; bonding the other surface of the film substrate to a second film substrate through a pressure-sensitive adhesive layer; and forming a second transparent electrode layer on the second film substrate through a second undercoat layer. Details of patterning of a transparent electrode for use in a touch sensor are described in WO 2006/126604 A1.

LIST OF PRIOR ART DOCUMENTS

Patent Documents

Patent Document 1: JP 2002-040243 A
Patent Document 2: JP 2002-055780 A
Patent Document 3: JP 2002-156920 A
Patent Document 4: JP 2010-198103 A
Patent Document 5: JP 2009-076432 A
Patent Document 6: WO 2006/126604 A1

SUMMARY OF THE INVENTION

Technical Problem

Although not described in any of the above Patent Documents, in a conventional display device, an edge print having a given width is provided on a back surface of a display window along an edge thereof. Then, a member located in underlying relation to the window is bonded to the window along a back side of the edge print through an adhesive layer. In the conventional display device having the above configuration, an air gap is formed between the window and the underlying member, and internal reflection occurs due to the air gap. Thus, even if a circular polarization element is disposed at a position close to the viewing side, as described in the Patent Documents 1 to 3, internally reflected light will be transmitted through the window, causing deterioration in display quality.

In the configuration disclosed in the Patent Document 4, one of the electrically conductive layers of the touch panel sensor is located at a position close to a protective cover as a window, so that internal reflection in this electrically conductive layer appears at a display section, causing deterioration in display quality. In the Patent Document 5, there is not any teaching or suggestion about how to cope with the problem of internal reflection.

In a display panel device having a capacitive touch input function, the present invention addresses a primary technical problem of maximally preventing deterioration in display quality due to internal reflection of light.

The configurations of the touch panels described in the Patent Document 4 and FIG. 5 of the Patent Document 5 have difficulty in production. Even in the configuration described in FIG. 7 of the Patent Document 5, the difficulty in production cannot be solved.

Therefore, the present invention addresses another technical problem of allowing a configuration for capacitive touch input to be more easily produced and more practical.

The present invention addresses yet another technical problem of forming a unit having a laminate for a touch input function, into a layered configuration which is capable of facilitating transfer to a next station for combining it with a display panel board, and is simplified and reduced in thickness as compared to the conventional devices.

Solution to the Technical Problem

In order to solve the above technical problems, according to a first aspect of the present invention, there is provided an optical unit for a display panel device having a capacitive touch input function. The optical unit comprises a combination of a touch panel laminate and a polarization functional laminate. In the optical unit, the touch panel laminate comprises an optically transparent first substrate layer laminated to one surface of an optically transparent adhesive layer, a first transparent electrically conductive layer laminated, through a first undercoat layer, to a surface of the first substrate layer on a side opposite to the adhesive layer, an optically transparent second substrate layer laminated to the other surface of the adhesive layer, and a second transparent electrically conductive layer laminated, through a second undercoat layer, to a surface of the second substrate layer on a side opposite side to the adhesive layer. Each of the first and second transparent electrically conductive layers is patterned in a predetermined pattern. The polarization functional laminate comprises a layer comprised of at least a circular polarization element. The polarization functional laminate is laminated, through an optically transparent adhesive layer, to one surface of the touch panel laminate on a side having one of the first and second transparent electrically conductive layers. The optical unit further comprises a release liner peelably bonded, through an optically transparent adhesive layer, to the other surface of the touch panel laminate on a side having a remaining one of the first and second transparent electrically conductive layers. The adhesive layer bonding the release liner to the touch panel laminate therethrough is adhered to the release liner with a weak peel force enough to be at least partly left on the side of the touch panel laminate in the form of a layer when the release liner is peeled.

In the optical unit according to the first aspect of the present invention, the first and second transparent electrically conductive layers are formed on opposite sides of a dielectric layer comprised of the first and second substrate layers and the adhesive layer disposed therebetween, through the first and second undercoat layers, respectively, to form an integral touch input sensor unit. Then, the polarization functional laminate is laminated to one surface of the integral touch input sensor unit through an optically transparent adhesive layer. That is, the polarization functional laminate is bonded, over the entire surface thereof, to the touch input sensor unit through the adhesive layer. Further, the release liner is bonded to the other surface of the touch input sensor unit through an adhesive layer. This allows the optical unit to ensure sufficient rigidity required for transfer to a next station, without further providing a substrate film and a hard coat layer thereoutside as in conventional touch input sensors. Thus, it becomes possible to reduce a total number of layers in a state in which the optical unit is assembled as a display panel device, thereby achieving a reduction in thickness of the device.

In the case where two transparent electrically conductive layers are provided, respectively, on opposite surfaces of a substrate film, a production apparatus different from a conventional type is required to form the electrically conductive layers on the respective opposite surfaces. For example, when the electrically conductive layers are formed by sputtering, it is necessary to employ a special apparatus for subjecting the opposite surfaces to sputtering. However, in the optical unit according to the first aspect of the present invention, after forming the first transparent electrically conductive layer on the first substrate layer, and forming the second transparent electrically conductive layer on the second substrate layer, the first and second substrate layers can be bonded together through an adhesive layer. This makes it possible to form the electrically conductive layer in a conventional process using a conventional sputtering apparatus.

In the optical unit according to the first aspect of the present invention, the touch input sensor unit having the above configuration further provides a production advantage. Specifically, in the case where each of the first and second electrically conductive layers is formed on a respective one of the first and second substrate layers through a respective one of the first and second undercoat layers, these substrate layers are available only in the form of material films having various thicknesses standardized by raw material suppliers. Further, in a step of forming an electrically conductive layer on a substrate film forming a substrate layer, through an undercoat layer, as the substrate film becomes thinner, production efficiency is further enhanced, and a product can be obtained with more stable quality. Therefore, in the optical unit according to the first aspect of the present invention, after a relatively thin film is selected from the group of films with standardized thicknesses available from raw material suppliers, a permittivity necessary for the touch input sensor unit can be adjusted in a flexible manner by appropriately selecting a material and a thickness of an adhesive layer.

The touch input sensor unit making up a part of the optical unit according to the first aspect of the present invention can be formed, for example, in the following manner. It is possible to employ a method comprising the steps of: preparing an adhesive sheet in which two release films are peelably bonded, respectively, to opposite surfaces of an adhesive formed in a layer; laminating the first undercoat layer to one surface of the first substrate layer and adherently forming the first transparent electrically conductive layer on the first undercoat layer; laminating the second undercoat layer to one surface of the second substrate layer and adherently forming the second transparent electrically conductive layer on the second undercoat layer; peeling one of the release films from a corresponding one of the opposite surfaces of the layer of adhesive, while sequentially bonding a portion of the layer of adhesive exposed along with the peeling of the release film, to the other surface of the first substrate layer; and peeling the other release film from the other surface of the layer of adhesive, while sequentially bonding a portion of the layer of adhesive exposed along with the peeling of the release film, to the other surface of the second substrate layer. Alternatively, it is possible to employ a method comprising the steps of: applying a solution of an adhesive to one surface of a release film, while continuously feeding the release film, to form an adhesive sheet in which the adhesive is formed in a layer and peelably bonded to the one surface of the release film; continuously laminating a first laminate to the layer of adhesive in the adhesive sheet being continuously fed, wherein the first laminate is prepared by laminating the first undercoat layer to one surface of the first substrate layer and adherently forming the first transparent electrically conductive layer on the first undercoat layer; and peeling the release film from the layer of adhesive, while sequentially bonding a second laminate to a portion of the layer of adhesive exposed along with the peeling of the release film, wherein the second laminate is prepared by laminating the second undercoat layer to one surface of the second substrate layer and adherently forming the second transparent electrically conductive layer on the second undercoat layer.

As the adhesive for forming the adhesive layer, it is possible to use an acrylic-based adhesive, a silicone-based adhesive, polyester-based adhesive, a rubber-based adhesive, or a polyurethane-based adhesive, for example. The adhesives may be used independently or in the form of a combination of two or more of them. Among them, it is preferable to use an acrylic-based adhesive containing as a primary component or a base polymer, an acrylic-based polymer comprising a primary monomer component consisting of an alkyl acrylate ester having an alkyl group with a carbon number of 1 to 18 [C 1-18 alkyl (meth) acrylate ester]. For example, the C 1-18 alkyl (meth) acrylate ester includes methyl (meth) acrylate, ethyl (meth) acrylate, propyl (meth) acrylate, isopropyl (meth) acrylate, butyl (meth) acrylate, isobutyl (meth) acrylate, sec-butyl (meth) acrylate, tert-butyl (meth) acrylate, pentyl (meth) acrylate, hexyl (meth) acrylate, heptyl (meth)

acrylate, octyl (meth) acrylate, isooctyl (meth) acrylate, 2-ethylhexyl (meth) acrylate, nonyl (meth) acrylate, isononyl (meth) acrylate, decyl (meth) acrylate, and dodecyl (meth) acrylate. The C 1-18 alkyl (meth) acrylate esters may be used independently or in the form of a mixture of two or more of them.

As a component of the acrylic-based polymer, a monomeric component (copolymerizable monomer) having a copolymerizability with respect to the C 1-18 alkyl (meth) acrylate ester may be used. In particular, when the acrylic-based polymer is subjected to cross-linking, it is preferable to use, as a copolymerizable monomer, an acrylic-based pressure-sensitive adhesive modifying monomer. As the modifying monomer, it is possible to use any one of various monomers known as an acrylic-based pressure-sensitive adhesive modifying monomer, for example. The copolymerizable monomers may be used independently or in the form of a combination of two or more of them. Specifically, the copolymerizable monomer includes, for example, a copolymerizable monomer having one of various functional groups (particularly, polar groups) (i.e., a functional group-containing copolymerizable monomer), a styrene-based monomer, such as styrene, and an α-olefin based monomer, such as ethylene or propylene. The functional group-containing copolymerizable monomer may include: vinylesters, such as vinyl acetate; cyano-containing copolymerizable monomer, such as (meth) acrylonitrile; amide-containing copolymerizable monomer, such as (meth) acrylamide, or N, N-dimethyl (meth) acrylamide; hydroxy-containing copolymerizable monomer, such as 2-hydroxyethyl (meth) acrylate, 3-hydroxypropyl (meth) acrylate, 4-hydroxybutyl (meth) acrylate, or 6-hydroxyhexyl (meth) acrylate; epoxy-containing copolymerizable monomer, such as glycidyl (meth) acrylate; amino-containing copolymerizable monomer, such as N, N-dimethylamine ethyl alkyl (meth) acrylate ester; and carboxy-containing copolymerizable monomer, such as (meth) acrylic acid, crotonic acid, itaconic acid, maleic acid, maleic anhydride or fumaric acid. As the modifying monomer, it is possible to use the functional group-containing copolymerizable monomers. Among them, a hydroxy-containing copolymerizable monomer and a carboxy-containing copolymerizable monomer are preferable, and an acrylic acid is particularly preferable. The acrylic-based polymer can be cross-linked by utilizing a functional group (particularly, polar group) derived from the modifying monomer. As a polymerization method for obtaining the acrylic-based polymer, it is possible to employ a solution polymerization method designed to be performed using a polymerization initiator such as azo-based compound or peroxide, an emulsion polymerization method, a bulk polymerization method, or a polymerization method designed to be performed using a photopolymerization initiator and in combination with irradiation with light or radiation.

As a cross-linking agent, a multifunctional melamine compound, a multifunctional epoxy compound and a multifunctional isocyanate compound are particularly preferable. The cross-linking agents may be used independently or in the form of a mixture of two or more of them. The multifunctional melamine compound includes methylated trimethylolmelamine, and butylated hexamethylolmelamine, for example. The multifunctional epoxy compound includes diglycidylaniline and glycerol diglycidyl ether, for example. For example, an amount of the multifunctional melamine compound and/or the multifunctional epoxy compound to be used is set in the range of 0.001 to 10 weight parts, preferably, in the range of 0.01 to 5 weight parts, with respect to 100 weight parts of the above polymer. The multifunctional isocyanate compound includes, for example, tolylene diisocyanate, hexamethylene diisocyanate, polymethylenepolyphenyl isocyanate, diphenylmethane diisocyanate, diphenylmethane diisocyanate dimer, reaction product between trimethylol propane and tolylene diisocyanate, reaction product between trimethylol propane and hexamethylene diisocyanate, polyether polyisocyanate, and polyester polyisocyanate. For example, an amount of the multifunctional isocyanate compound to be used is set in the range of 0.01 to 20 weight parts, preferably, in the range of 0.05 to 15 weight parts, with respect to 100 weight parts of the above polymer.

As the release liner, it is possible to suitably use a plastic film (particularly, PET (polyethylene terephthalate) film) having a smooth surface subjected to a release treatment. Preferably, a peel force of the release liner is set to 0.05 to 1.00 N/50 mm.

<Measurement of Peel Force of Release Liner>

An optical member with a release liner cut into a size of 50 mm width×100 mm length was prepared, and a peel force of the release liner was measured by a universal tension tester, under a condition that the release liner is peeled at a tensile elongation rate of 300 mm/min (peel angle of 180 degrees). The measurement was performed in an environment of 23° C.×50% RH.

Preferably, the adhesive layer has high transparency. For example, it is desirable that a total light transmittance (based on JIS K 7136) in a visible light wavelength range is 85% or more (preferably, 87% or more, more preferably, 90% or more).

A haze value (based on JIS K 7136) of a double-side adhesive sheet 1 may be selectively set to 2.0% or less (preferably, 1.0% or less, more preferably, 0.5% or less).

Preferably, each of the first and second substrate layers is formed of a polyethylene terephthalate (PET) film. However, other materials may also be used. The undercoat layer is designed to prevent internal reflection, and related information, such as usable materials and anti-reflection functions, is described in detail in the Patent Document 5. In the present invention, the materials described in the Patent Document 5 may be used for the undercoat layer.

The polarization functional laminate comprises at least a circular polarization element. Specifically, the polarization functional laminate has a structure in which a layer of polarizer for producing linearly polarized light, and a ¼ λ phase difference layer, are laminated in this order, when viewed from a viewing side of a display device which incorporates the optical unit. A ½ λ phase difference layer may be added to the ¼ λ phase difference layer. In this case, circularly polarized light with high fidelity can be obtained. A configuration and operation of the circular polarization element are described in detail in the Patent Document 3.

In one usage mode of the optical unit according to the first aspect of the present invention, when the optical unit is incorporated into a display panel device, the release liner is peeled. In this operation, the release liner is peeled while allowing the transparent adhesive layer to be at least partly left on the side of the touch panel laminate in the form of a layer. Then, a window is bonded to the touch panel laminate through the part of the adhesive layer left in the form of a layer. Although an edge print is provided on the window along an edge, a step due to the edge print can be filled with the adhesive layer. Thus, no air gap is formed inside the window, so that internal reflection at this position can be suppressed. In this usage mode, a display panel board is bonded to the polarization functional laminate. The display panel board may be a liquid crystal panel board or an organic EL element board.

In another usage mode, a display panel board is bonded to the part of the adhesive layer left on the side of the touch panel laminate in the form of a layer after peeling the release layer. In this case, the polarization functional laminate is disposed on the viewing side. Optionally, a window may be bonded to an outer surface of the polarization functional laminate through an optically transparent adhesive layer.

In a second aspect of the present invention, the above optical unit is formed in an elongate shape and wound in a roll form, and this roll is used for production of a display panel device. Accordingly, the present invention provides a display panel device production method for producing a display panel device using the roll of optical unit. In one embodiment, this method comprises the steps of: sequentially feeding a plurality of display panel boards each comprising an optical display element, toward a lamination position; unrolling the optical unit from the roll; cutting the unrolled optical unit into a feed directional length dimension corresponding to a length of the display panel board in a feed direction thereof, to form an optical unit sheet; feeding the optical unit sheet to allow the polarization functional laminate in the optical unit sheet to be superimposed with respect to a corresponding one of the display panel boards at the lamination position; and laminating the optical unit sheet to the corresponding display panel board through an optically transparent adhesive.

In another embodiment, the method comprises the steps of: sequentially feeding a plurality of display panel boards each comprising an optical display element, toward a lamination position; unrolling the optical unit from the roll; cutting a portion of the unrolled optical unit other than the release liner of the optical unit into a feed directional length dimension corresponding to a length of the display panel board in a feed direction thereof, to form an optical unit sheet; feeding the optical unit sheet to allow the optical unit sheet to be peeled from the release liner of the optical unit at the lamination position so as to allow a surface of the peeled optical unit sheet on a side opposite to the polarization functional laminate in the optical unit sheet to be superimposed with respect to a corresponding one of the display panel boards; and laminating the optical unit sheet to the corresponding display panel board through the optically transparent adhesive layer which has adhered the release liner.

The method using the elongate optical unit, according to the second aspect of the present invention, makes it possible to continuously laminate the unrolled optical unit directly to a display panel board, and allow the production process to become more efficient.

According to a third aspect of the present invention, there is provided an optical unit for a display panel device having a capacitive touch input function. This optical unit comprises a combination of a touch panel laminate and a polarization functional laminate. The touch panel laminate comprises: an optically transparent first substrate layer laminated to one surface of an optically transparent adhesive layer; a first transparent electrically conductive layer laminated, through a first undercoat layer, to a surface of the first substrate layer on a side opposite to the adhesive layer; an optically transparent second substrate layer laminated to the other surface of the adhesive layer; and a second transparent electrically conductive layer laminated, through a second undercoat layer, to a surface of the second substrate layer on a side opposite side to the adhesive layer. Each of the first and second transparent electrically conductive layers is patterned in a predetermined pattern. The polarization functional laminate comprises a layer comprised of at least a circular polarization element, and is laminate is laminated, through an optically transparent adhesive layer, to one surface of the touch panel laminate on a side having one of the first and second transparent electrically conductive layers. A transparent window is laminated, through an optically transparent adhesive layer, to the other surface of the touch panel laminate on a side having a remaining one of the first and second transparent electrically conductive layers.

According to a fourth aspect of the present invention, there is provided an optical unit for a display panel device having a capacitive touch input function. This optical unit comprises a combination of a touch panel laminate and a polarization functional laminate. The touch panel laminate comprises: an optically transparent first substrate layer laminated to one surface of an optically transparent adhesive layer; a first transparent electrically conductive layer laminated, through a first undercoat layer, to a surface of the first substrate layer on a side opposite to the adhesive layer; an optically transparent second substrate layer laminated to the other surface of the adhesive layer; and a second transparent electrically conductive layer laminated, through a second undercoat layer, to a surface of the second substrate layer on a side opposite side to the adhesive layer. Each of the first and second transparent electrically conductive layers is patterned in a predetermined pattern. The polarization functional laminate comprises a layer comprised of at least a circular polarization element, and is laminated, through an optically transparent adhesive layer, to one surface of the touch panel laminate on a side having one of the first and second transparent electrically conductive layers.

According to a fifth aspect of the present invention, there is provided an optical unit for a display panel device having a capacitive touch input function. This optical unit comprises a combination of a touch panel laminate and a polarization functional laminate. The touch panel laminate comprises: an optically transparent first substrate layer laminated to one surface of an optically transparent adhesive layer, a first transparent electrically conductive layer laminated, through a first undercoat layer, to a surface of the first substrate layer on a side opposite to the adhesive layer; an optically transparent second substrate layer laminated to the other surface of the adhesive layer; and a second transparent electrically conductive layer laminated, through a second undercoat layer, to a surface of the second substrate layer on a side opposite side to the adhesive layer, wherein each of the first and second transparent electrically conductive layers is patterned in a predetermined pattern. The polarization functional laminate comprises a layer comprised of at least a circular polarization element, and is laminated, through an optically transparent adhesive layer, to one surface of the touch panel laminate on a side having one of the first and second transparent electrically conductive layers. The optical unit further comprises: a first release liner peelably bonded, through an optically transparent adhesive layer, to the other surface of the touch panel laminate on a side having a remaining one of the first and second transparent electrically conductive layers; and a second release liner peelably bonded, through an optically transparent adhesive layer, to a surface of the polarization functional laminate on a side opposite to the touch panel laminate, wherein each of the adhesive layer bonding the first release liner and the adhesive layer bonding the second release liner is adhered to a respective one of the first and second release liners with a weak peel force enough to be at least partly left on the side of a corresponding one of the touch panel laminate and the polarization functional laminate in the form of a layer when the release liner is peeled.

According to a sixth aspect of the present invention, there is provided an optical unit for a display panel device having a capacitive touch input function. This optical unit comprises a combination of a touch panel laminate and a polarization functional laminate. The touch panel laminate comprises: an optically transparent first substrate layer laminated to one surface of an optically transparent adhesive layer; a first transparent electrically conductive layer laminated, through a first undercoat layer, to a surface of the first substrate layer on a side opposite to the adhesive layer; an optically transparent second substrate layer laminated to the other surface of the adhesive layer; and a second transparent electrically conductive layer laminated, through a second undercoat layer, to a surface of the second substrate layer on a side opposite side to the adhesive layer, wherein each of the first and second transparent electrically conductive layers is patterned in a predetermined pattern. The polarization functional laminate comprises a layer comprised of at least a circular polarization element, and is laminated, through an optically transparent adhesive layer, to one surface of the touch panel laminate on a side having one of the first and second transparent electrically conductive layers. The optical unit further comprises: a hard coat film bonded, through an optically transparent adhesive layer, to the other surface of the touch panel laminate on a side having a remaining one of the first and second transparent electrically conductive layers; and a release liner peelably bonded to the polarization functional laminate through an optically transparent adhesive layer, wherein the adhesive layer bonding the release liner to the polarization functional laminate therethrough is adhered to the release liner with a weak peel force enough to be at least partly left on the side of the polarization functional laminate in the form of a layer when the release liner is peeled.

According to a seventh aspect of the present invention, there is provided an optical unit including: a touch panel laminate comprising an optically transparent first substrate layer laminated to one surface of an optically transparent adhesive layer, a first transparent electrically conductive layer laminated, through a first undercoat layer, to a surface of the first substrate layer on a side opposite to the adhesive layer, an optically transparent second substrate layer laminated to the other surface of the adhesive layer, and a second transparent electrically conductive layer laminated, through a second undercoat layer, to a surface of the second substrate layer on a side opposite side to the adhesive layer, each of the first and second transparent electrically conductive layers being patterned in a predetermined pattern; and a polarization functional laminate comprising a layer comprised of at least a circular polarization element, and being laminated, through an optically transparent adhesive layer, to a surface of the touch panel laminate on a side having one of the first and second transparent electrically conductive layers; a transparent window may be laminated, through an optically transparent adhesive layer, to a surface of the polarization functional laminate on a side having the other of the first and second transparent electrically conductive layers, and a hard coat film may be bonded, through an optically transparent adhesive layer, to a surface of the touch panel laminate on a side opposite to the polarization functional laminate.

The present invention further provides a display panel device which comprises: an optical unit including a combination of a touch panel laminate for capacitive touch input, and a polarization functional laminate. In one embodiment, the display panel device comprises: a touch panel laminate which comprises an optically transparent first substrate layer laminated to one surface of an optically transparent adhesive layer, a first transparent electrically conductive layer laminated, through a first undercoat layer, to a surface of the first substrate layer on a side opposite to the adhesive layer, an optically transparent second substrate layer laminated to the other surface of the adhesive layer, and a second transparent electrically conductive layer laminated, through a second undercoat layer, to a surface of the second substrate layer on a side opposite side to the adhesive layer, wherein each of the first and second transparent electrically conductive layers is patterned in a predetermined pattern; a polarization functional laminate which comprises a layer comprised of at least a circular polarization element, and is laminated, through an optically transparent adhesive layer, to one surface of the touch panel laminate on a side having one of the first and second transparent electrically conductive layers; a transparent window laminated, through an optically transparent adhesive layer, to the other surface of the touch panel laminate on a side having a remaining one of the first and second transparent electrically conductive layers; and a display panel board bonded, through an optically transparent adhesive layer, to a surface of the polarization functional laminate on a side opposite to the touch panel laminate.

Effect of the Invention

As mentioned above, in a display panel device having a capacitive touch input function, the present invention makes it possible to maximally prevent deterioration in display quality due to internal reflection of light.

In addition, the present invention makes it possible to allow a configuration for capacitive touch input to be more easily produced and more practical. Further, the present invention makes it possible to form a unit having a laminate for a touch input function, into a layered configuration which is capable of facilitating transfer to a next station for combining it with a display panel board, and is simplified and reduced in thickness as compared to the conventional devices.

BRIEF DESCRIPTION OF THE DRAWINGS

FIG. 9(b) is a schematic sectional view of a substrate coated with an undercoat layer.

FIGS. 10(a) to 10(c) illustrate a process of forming an electrically conductive layer on the undercoat layer-coated substrate, wherein FIGS. 10(a), 10(b) and 10(c) are, respectively, a schematic block diagram of the process, a sectional view of an electrically conductive laminate to be obtained, and a sectional view of an adhesive layer-laminated electrically conductive laminate to be obtained by laminating the adhesive layer to the electrically conductive laminate.

FIGS. 12(a) and 12(b) illustrate a station for forming an optical unit, wherein FIG. 12(a) is a schematic block diagram of a sub-station for adhering the adhesive layer to the touch panel laminate, and FIG. 12(b) is a schematic diagram of a sub-station for laminating the polarization functional laminate to the resulting laminate.

FIGS. 13(a) and 13(b) illustrate a station for bonding a display panel board to the optical unit, wherein FIG. 13(a) is a perspective view schematically illustrating the station, and FIG. 13(b) is a sectional view of the station.

DESCRIPTION OF EMBODIMENTS

Figure 1:
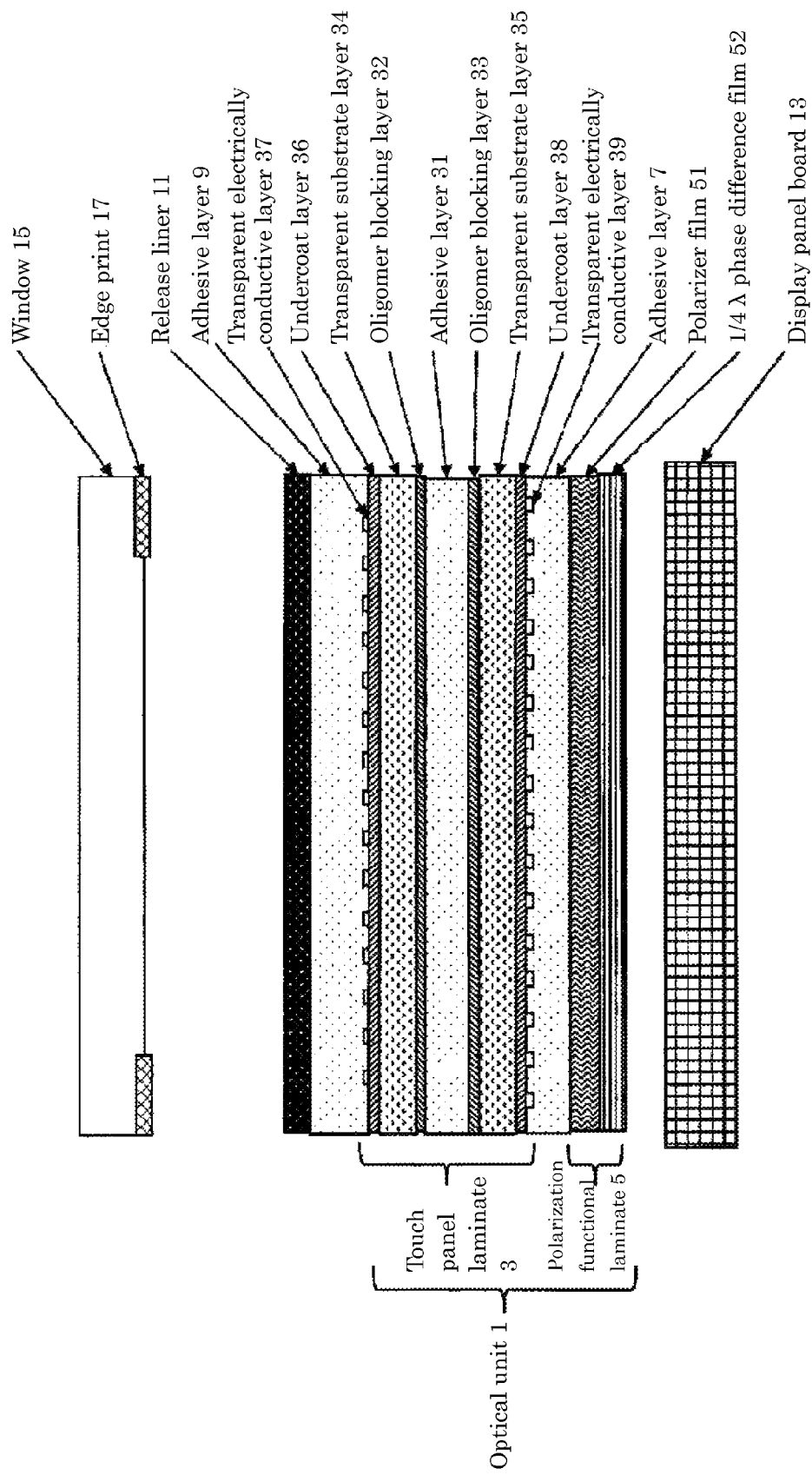
FIG. 1 is a schematic sectional view illustrating an optical unit according to one embodiment of the present invention, in relationship with a window and a display panel board.

Referring to FIG. 1, an optical unit 1 according to one embodiment of the present invention comprises a touch panel laminate 3 and a polarization functional laminate 5. The touch panel laminate 3 comprises optically transparent first and second substrate layers 34, 35 each adhesively bonded to a respective one of opposite surfaces of an optically transparent adhesive layer 31 through a respective one of optically transparent first and second oligomer blocking layers 32, 33. An optically transparent undercoat layer 36 is bonded to a surface of the first substrate layer 34 on a side opposite to the first oligomer blocking layer 32, and an optically transparent first electrically conductive layer 37 is adherently formed on the undercoat layer 36, for example, by means of sputtering. Similarly, an optically transparent undercoat layer 38 is bonded to a surface of the second substrate layer 35 on a side opposite to the second oligomer blocking layer 33, and an optically transparent second electrically conductive layer 39 is adherently formed on the undercoat layer 38, for example, by means of sputtering. This touch panel laminate 3 makes up a touch input sensor unit. As is well known in this technical field, each of the first and second electrically conductive layers 37, 38 is patterned in a predetermined pattern.

The polarization functional laminate 5 is bonded through an optically transparent adhesive layer 7 to one surface of the touch panel laminate 3 making up the touch input sensor unit, i.e., a surface of the touch panel laminate 3 on a side having the second electrically conductive layer 39. The polarization functional laminate 5 is composed of a polarizer film 51 on a side facing the adhesive layer 7, and a ¼ λ phase difference film 52 laminated to the polarizer film 51, and forms a circular polarization element. As is taught by the Patent Document 3, a ½ λ phase difference film (not illustrated) may be provided in addition to the ¼ λ phase difference film 52.

A release liner 11 is bonded to the other surface of the touch panel laminate 3, i.e., a surface of the touch panel laminate 3 on a side having the first electrically conductive layer 37, through an optically transparent adhesive layer 9. An adhesion force of the release liner 11 with respect to the adhesive layer 9 is set to a level enough to allow the adhesive layer 9 to be at least partly left, in the form of a layer, on the patterned first electrically conductive layer 37 and a portion of the first undercoat layer 36 exposed from openings of the pattern of the first electrically conductive layer 37, when the release liner 11 is peeled.

In the layer arrangement of the optical unit 1 illustrated in FIG. 1, a display panel board 13 is bonded to the polarization functional laminate 5 through a non-illustrated optically transparent adhesive layer. In the illustrated embodiment, the display panel board 13 is a type comprising an organic EL element. Alternatively, it may be a liquid crystal display panel board.

Further, after peeling the release liner 11, a transparent window 15 is bonded to the touch panel laminate 3 through the left adhesive layer 9. That is, the window 15 is bonded, over the entire surface thereof, to the touch panel laminate 3 through the left adhesive layer 9. As illustrated in FIG. 1, an edge print 17 is provided on the window 15 along an edge of an inner surface thereof. As can be seen from FIG. 1, a step is formed due to the edge print 17. However, in the configuration illustrated in FIG. 1, the entire surface of the window 15 is bonded to the touch panel laminate 3 through the left adhesive layer 9, so that the step due to the edge print 17 will be filled with an adhesive of the left adhesive layer 9. Thus, in the embodiment illustrated in FIG. 1, it becomes possible to prevent formation of an air gap between the window 15 and the touch panel laminate 3, thereby suppressing internal reflection due to the air gap.

Figure 2:
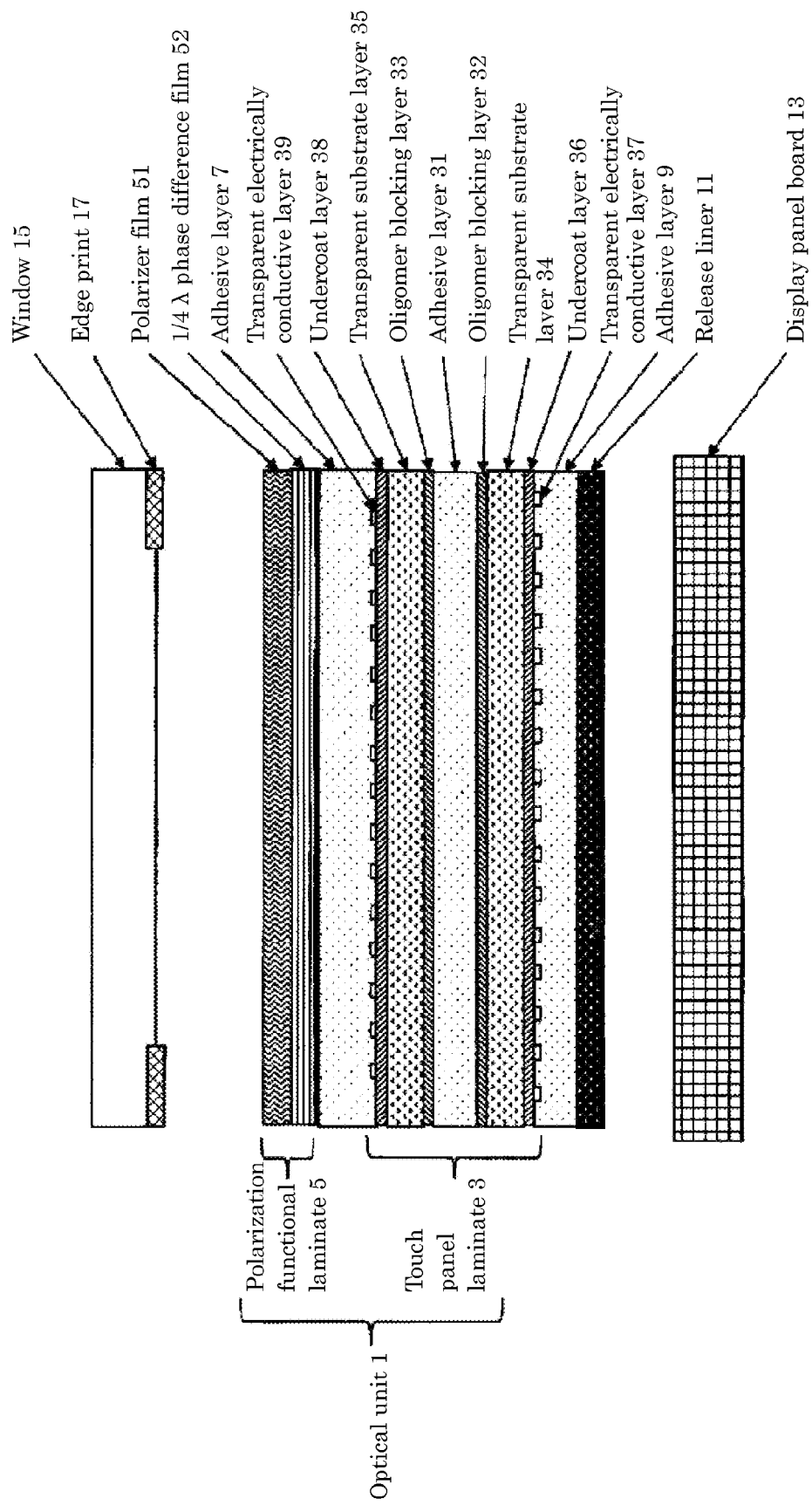
FIG. 2 is a schematic sectional view illustrating an optical unit according to another embodiment of the present invention, in the same manner as that in FIG. 1.

FIG. 2 illustrates another embodiment of the present invention. In this embodiment, an element or component corresponding to that in FIG. 1 is illustrated by assigning thereto the same reference numeral or code as that in FIG. 1, and its detailed description will be omitted. An optical unit in FIG. 2 has an upside-down arrangement with respect to that in FIG. 1. That is, in a polarization functional laminate 5, a polarizer film 51 is disposed outside, and a ¼ λ phase difference film 52 is bonded to an adhesive layer 7. Thus, the polarization functional laminate 5 is disposed on the viewing side. In this optical unit 1, the polarizer film 51 of the polarization functional laminate 5 is bonded to a window 15 through an optically transparent adhesive layer (not illustrated). A display panel board 13 is bonded to an adhesive layer 9 exposed after peeling a release liner 11.

Figure 3:
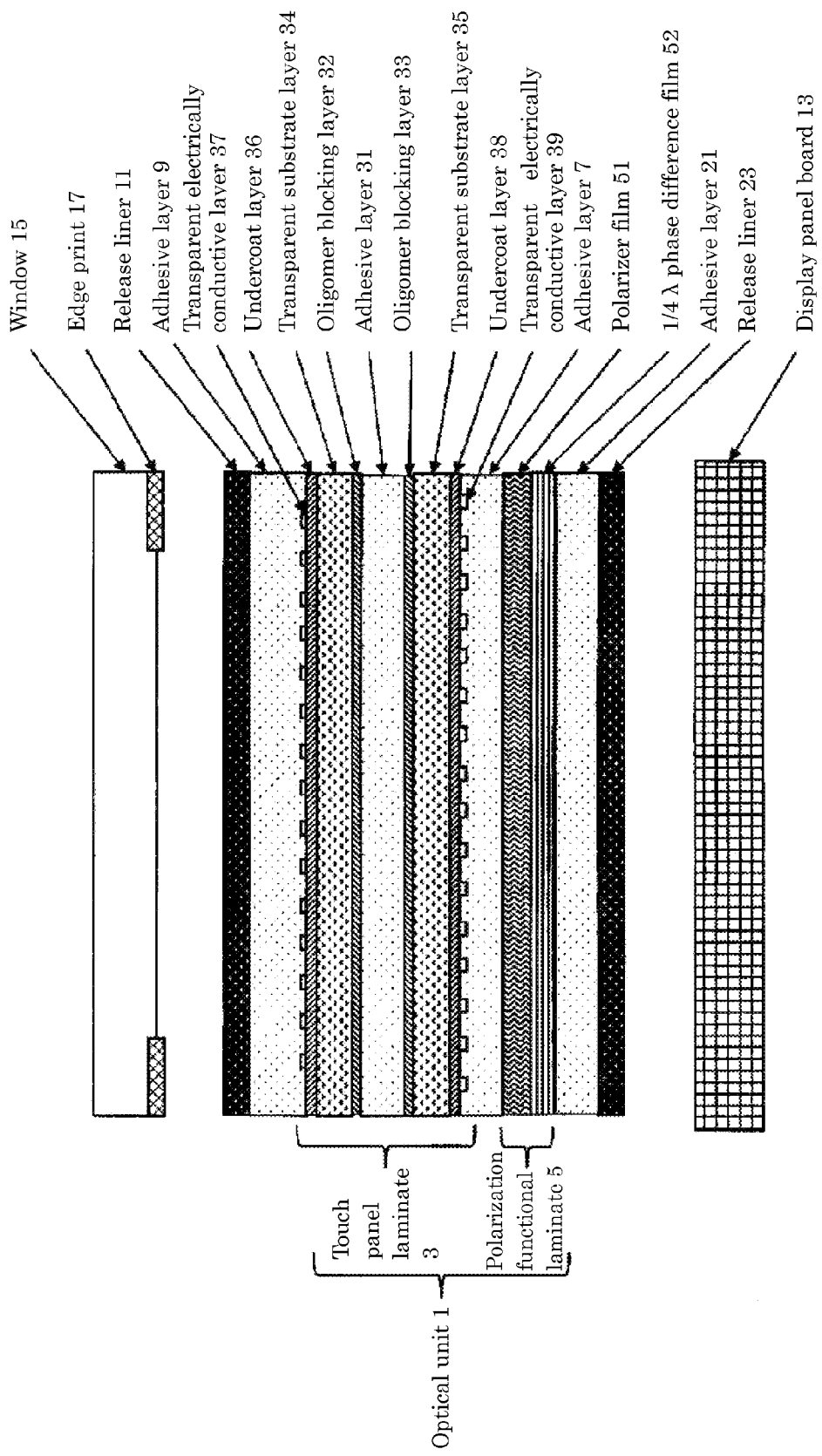
FIG. 3 is a schematic sectional view illustrating an optical unit according to yet another embodiment of the present invention, in the same manner as that in FIG. 1.

FIG. 3 is a sectional view corresponding to FIG. 1, which illustrates yet another embodiment of the present invention as a modification of the optical unit 1 illustrated in FIG. 1. In the embodiment illustrated in FIG. 3, an optically transparent release liner 23 is bonded to an outer surface of the polarization functional laminate 5 through an optically transparent adhesive layer 21. In the configuration of this optical unit 1, an adhesion force of the release liner 23 with respect to the adhesive layer 21 is also set to a level enough to allow the adhesive layer 21 to be at least partly left on the polarization functional laminate 5 in the form of a layer, when the release liner 23 is peeled. The window 15 is adhesively bonded in the same manner as that in the embodiment illustrated in FIG. 1. In the embodiment illustrated in FIG. 3, after peeling the release liner 23, the display panel board is bonded to the polarization functional laminate 5 through the left adhesive layer 21.

Figure 4:
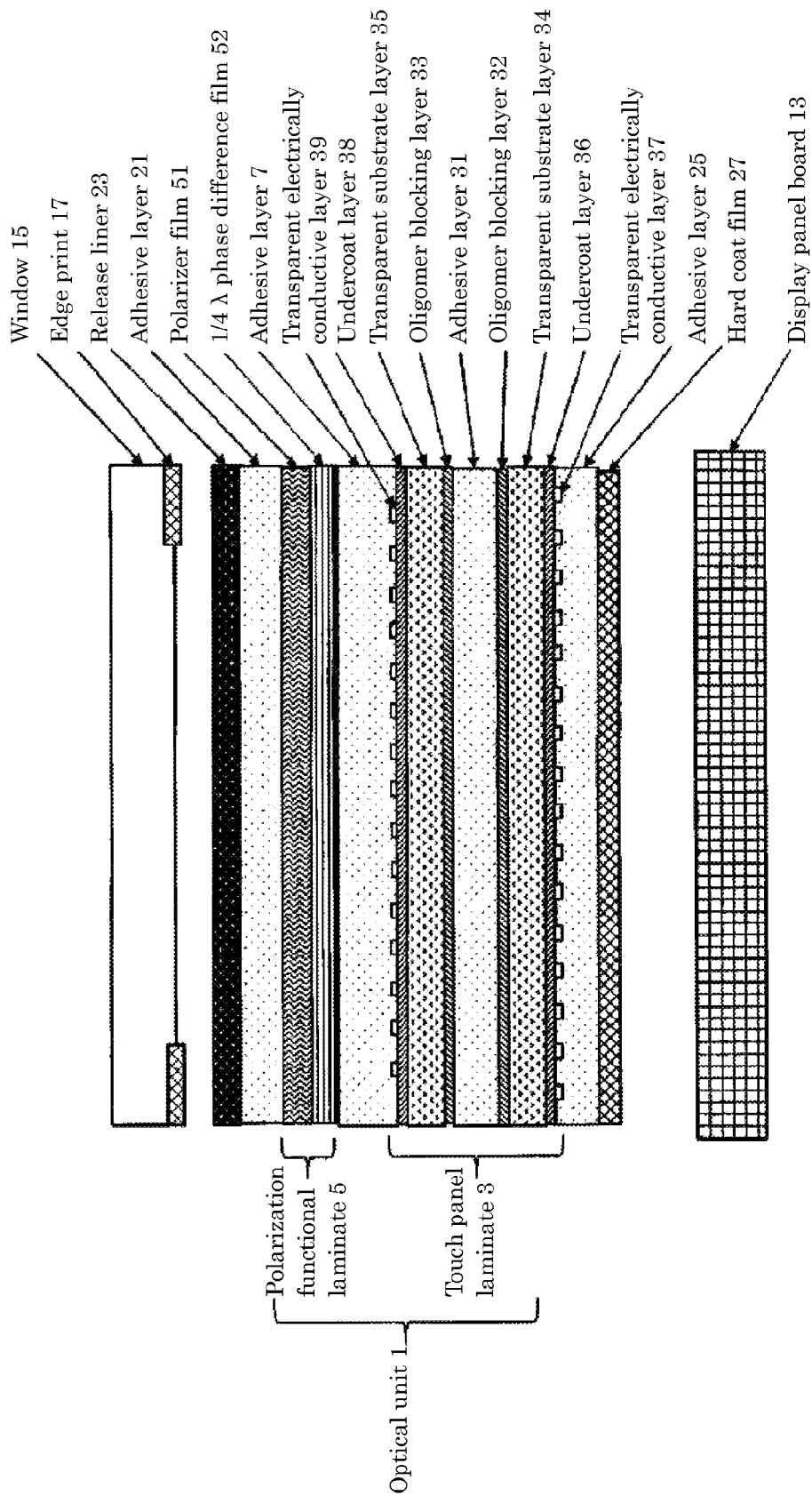
FIG. 4 is a schematic sectional view illustrating an optical unit according to still another embodiment of the present invention, in the same manner as that in FIG. 2.

FIG. 4 is a sectional view corresponding to FIG. 2, which illustrates still another embodiment of the present invention as a modification of the embodiment illustrated in FIG. 2. In this embodiment, a release liner 23 is bonded to the polarizer film 51 of the polarization functional laminate 5 through an optically transparent adhesive layer 21. An adhesion force of the release liner 23 with respect to the adhesive layer 21 is set in the same manner as that in the embodiment illustrated in FIG. 3. A hard coat film 27 is bonded to a surface of the touch panel laminate 3 on a side opposite to the polarization functional laminate 5 through an optically transparent adhesive 25. After peeling the release liner 23, the window 15 is bonded to the optical unit 1 through at least a part of the adhesive layer 21 exposed after peeling the release liner 23. The hard coat layer 27 is bonded to the display panel board 13 through a non-illustrated optically transparent adhesive layer.

An example of each layer for use in production of the optical unit of the present invention will be described in detail below.

EXAMPLE 1

Formation of Optically Transparent Adhesive Layer

Figure 5:
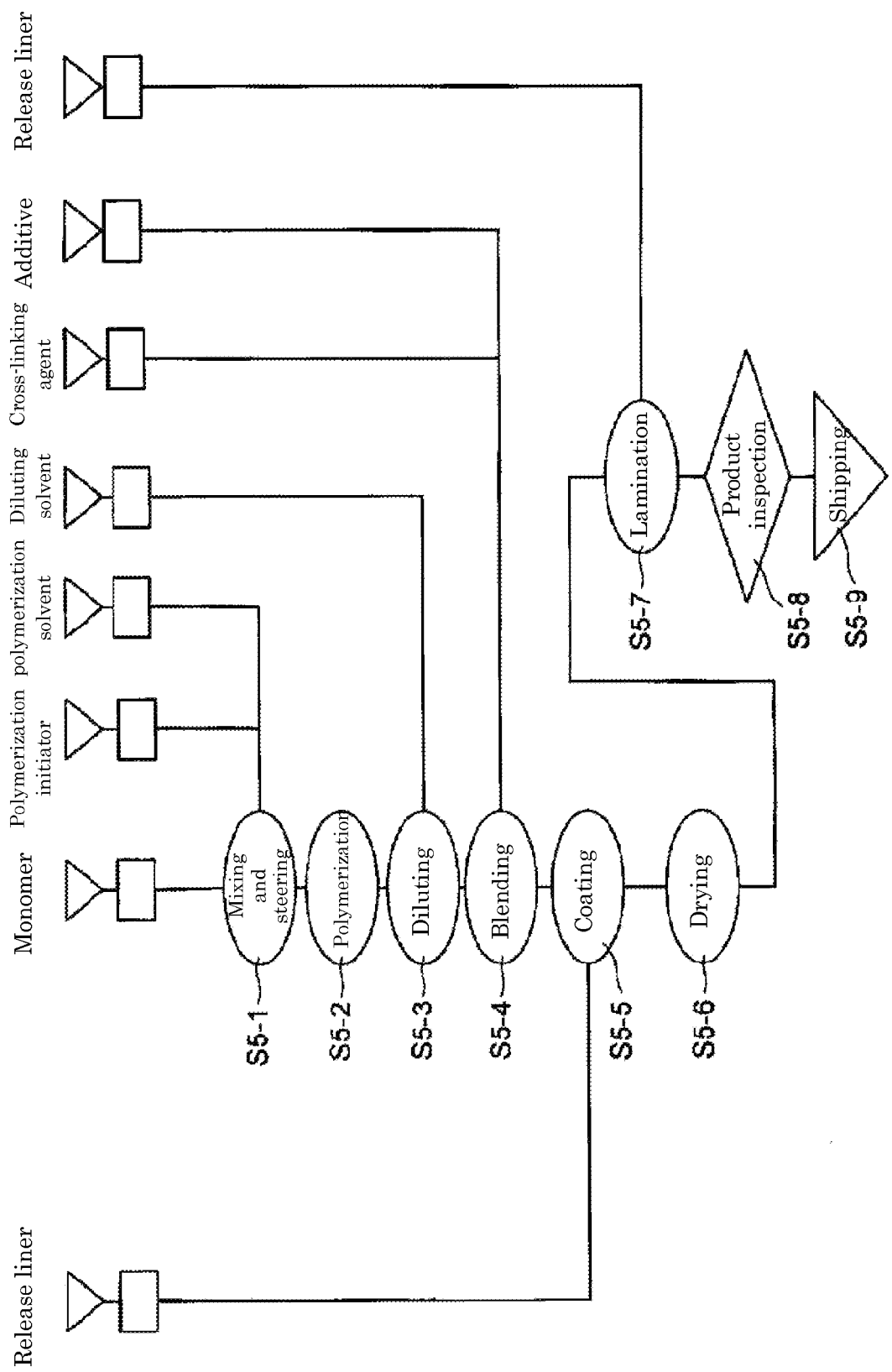
FIG. 5 is a process diagram illustrating a process of producing a sheet comprising an optically transparent adhesive layer.

FIG. 5 is a process diagram illustrating a process of producing an optically transparent adhesive layer usable in the present invention. First of all, a monomer as a basic raw material of an adhesive and a polymerization initiator were mixed and stirred together with a solvent. As the monomer, a mixture consisting of 70 weight parts of 2-methoxyethyl acrylate, 29 weight parts of 2-ethylhexyl acrylate, and 1 weight parts of 4-hydroxybutyl acrylate was used. 0.2 weight parts of 2, 2'-azobisisobutyronitrile was used as the polymerization initiator, and 100 weight parts of ethyl acetate was used as a polymerization solvent. These materials were put in a separable flask, and stirred for one hour while introducing nitrogen gas thereinto (S5-1). After removing oxygen in a polymerization system in the above manner, the solution was heated up to 63° C. to conduct a reaction for 10 hours (S5-2), and then toluene was added to obtain an acrylic-based polymer solution having a solid content concentration of 25 weight % (S5-3). This acrylic-based polymer solution will hereinafter be referred to occasionally as "acrylic-based polymer solution A". Further, an acrylic-based polymer contained in the acrylic-based polymer solution A will hereinafter be referred to occasionally as "acrylic-based polymer A". A weight-average molecular weight Mw of the acrylic-based polymer A was 1500,000. The weight-average molecular weight Mw can be measured by a gel permeation chromatography (GPC). Specifically, as a GPC measurement device, "HLC-8120 GPC" (trade name, produced by Tosoh Corporation) was used. The weight-average molecular weight Mw can be obtained as a value on a polystyrene equivalent basis by performing a measurement under the following GPC measurement conditions.

GPC Measurement Conditions
Concentration of sample: 0.2 weight % (tetrahydrofuran solution)
Injection amount of sample: 10 μL
Eluant: tetrahydrofuran (THF)
Flow rate (flow velocity): 0.6 mL/min
Column temperature (measurement temperature): 40° C.
Column: "TSKgelSuper HM-H/H4000/H3000/H2000 (trade name, produced by Tosoh Corporation)
Detector: differential refractometer (RI)

Figure 6:
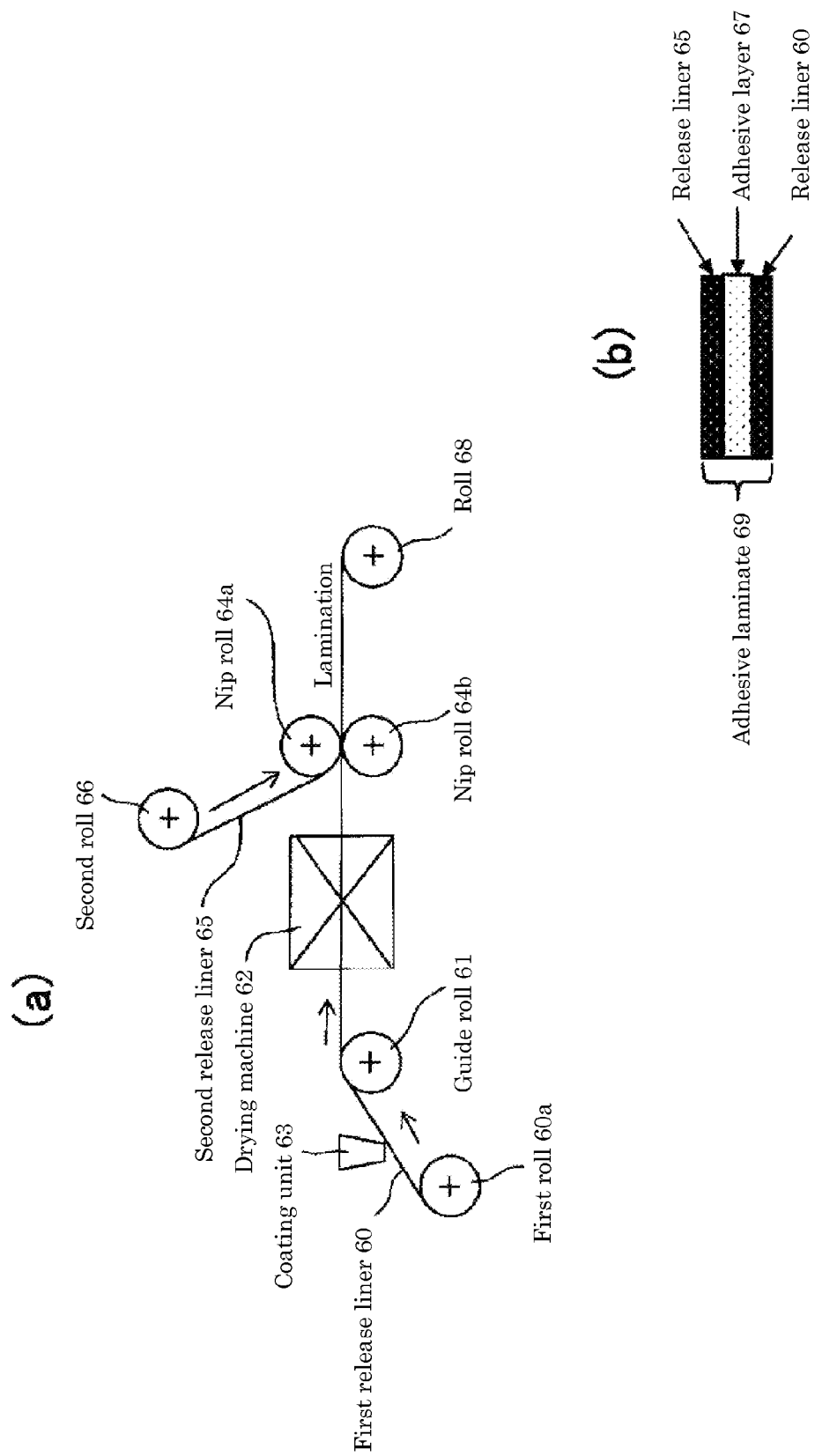
FIGS. 6(*a*) and 6(*b*) illustrate a coating and laminating station for the process illustrated in FIG. 5, wherein FIG. 6(*a*) is a schematic diagram of the entire station, and FIG. 6(*b*) is a schematic sectional view of an adhesive laminate after lamination.

A cross-linking agent and an additive were blended with the polymerized acrylic-based polymer to obtain an adhesive composition (S5-4). As the cross-linking agent, a multifunctional isocyanate compound (trade name "CORONATE L" produced by Nippon Polyurethane industry Co., Ltd.) was added to 100 weight parts of the acrylic-based polymer solution A (100 weight parts of the acrylic-based polymer A) in an amount of 0.3 weight parts to prepare an adhesive composition in a solution form. The adhesive composition obtained in this manner was coatingly applied to a release liner (S5-5). FIG. 6(a) is a schematic diagram illustrating a coating station for this step. In this station, a release liner 60 is prepared in the form of a roll 60a, and fed to a drying machine 62 via a guide roll 61. In the course of reaching the guide roll 61, the adhesive solution prepared in the above step is applied from a coating unit 63 to the release liner 60 unrolled from the roll 60a, to form a layer thereon. In this example, a 38 μm-thick polyethylene terephthalate (PET) film having a surface subjected to a release treatment was used as the release liner 60. The adhesive solution was applied to the release-treated surface of release liner 60 to allow the adhesive layer to have a dried thickness of 25 μm. The release liner 60 applied with the adhesive solution is fed to pass through a drying machine 62 to vaporize the solvent of the adhesive solution. The release liner 60 existing from the drying machine 62 is fed to pass through a pair of nip rolls 64a, 64b. A second release liner 65 unrolled from a second roll 66 is concurrently fed to the nip rolls 64a, 64b in such a manner as to be superimposed with respect to the adhesive layer formed on the first release liner 60, and pressed against and bonded to the adhesive layer by the nip rolls 64a, 64b. The second release liner 65 is formed by the same film as that of the first release liner 60, and a surface thereof to be bonded to the adhesive layer is subjected to a release treatment so as to allow a peel force of the second release liner 65 with respect to the adhesive layer to become smaller than that of the first release liner 60.

A laminate exiting from the first nip rolls 64a, 64b is formed in a structure in which the first and second release liners 60, 65 are laminated, respectively, on opposite sides of the adhesive layer 67 as illustrated in FIG. 6(b), and wound as a roll 68. In FIG. 5, a step of the drying is indicated as S5-6, and a step of the lamination of the second release liner 65 is indicated as S5-7. The produced adhesive laminate 69 is shipped (S5-9) via product inspection (S5-8).

(Formation of Polarizer Film)

FIGS. 7(a) and 7(b) illustrate a production station for a polarizer film. A film 71 as a raw material is made of a polymer material consisting primarily of a polyvinyl alcohol (PVA)-based resin, and prepared in the form of a roll 72. The PVA film 71 unrolled from the roll 72 is immersed in water in a water tank 73 to swell with water. Then, the water-swelled PVA film 71 is fed to pass through a dyeing tank 74 having an iodine-containing dyeing solution, so that, in the tank 74, it is impregnated with iodine. Then, the PVA film 71 impregnated with iodine is fed to pass through first and second cross-linking tanks 75, 76. In the cross-linking tanks 75, 76, a cross-linking bath containing potassium iodide and boric acid is formed, and a cross-linking treatment is promoted therein. During the course of the cross-linking treatment, the PVA film 71 is subjected to stretching. This stretching is performed by setting respective drive speeds of inlet-side and outlet-side rolls for feeding the PVA film 71 in such a manner that the drive speed of the outlet-side roll becomes greater than that of the inlet-side roll. The PVA film 71 subjected to the stretching is washed with water in a water washing tank 77, and then two protective films 78a, 78a are laminated, respective, to opposite surfaces of the stretched PVA film 71 to form a laminate 79 as illustrated in FIG. 7(b).

(Formation of Phase Difference Film)

A phase difference film can be prepared by controlling a stretch ratio and a stretch temperature of a resin film. The stretch ratio may be appropriately determined depending on a desired phase difference, a film thickness required for optical compensation of a phase difference film, a type of resin to be used, a thickness of a film to be used, a stretch temperature, etc. Production of such a phase difference film is well known. A ¼ λ phase difference film usable in the present invention is prepared using the well-known technique to produce a phase difference of a ¼ λ phase.

(Formation of Polarization Functional Laminate)

Figure 7:
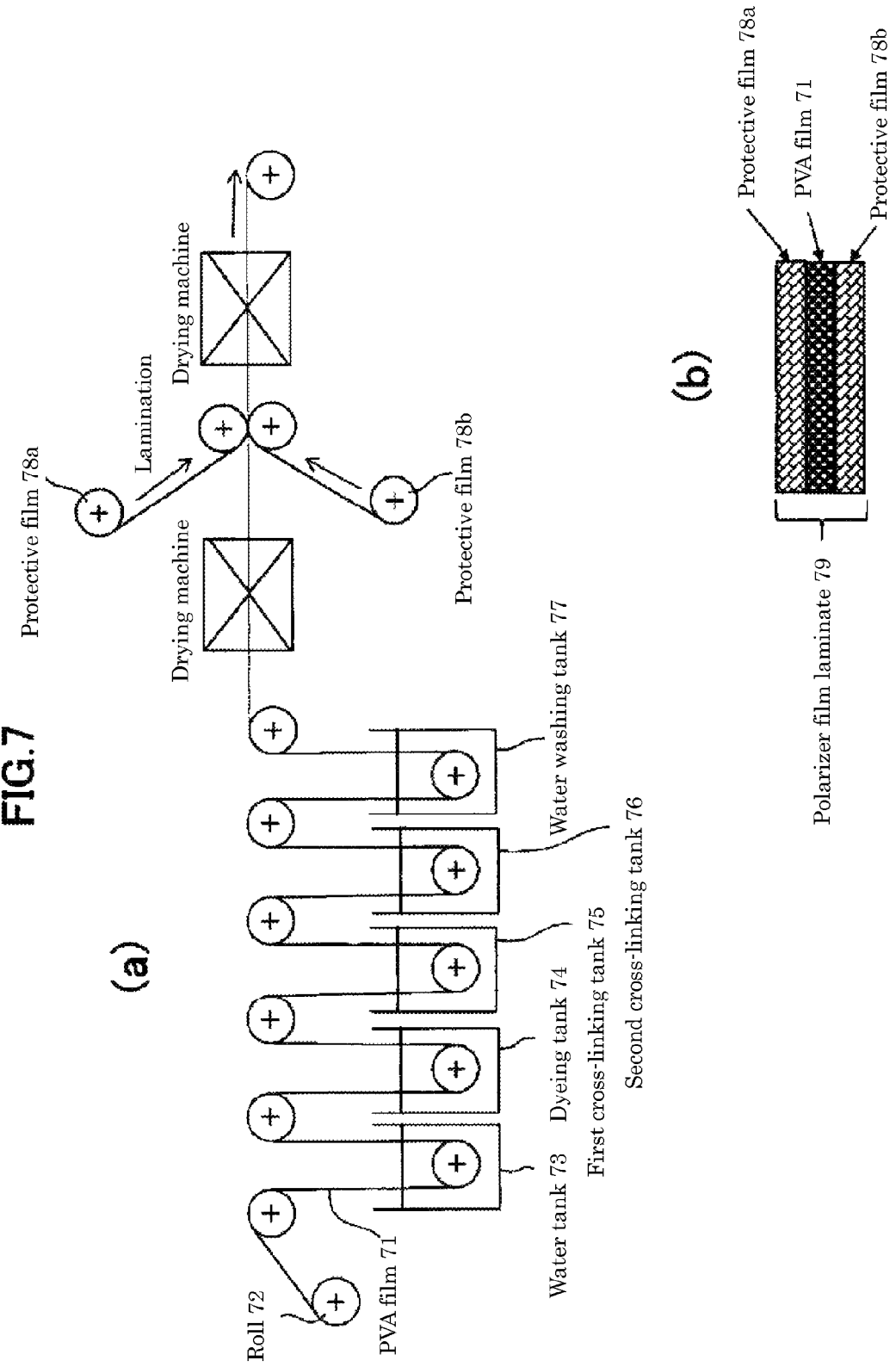
FIGS. 7(*a*) and 7(*b*) illustrate a station for producing a polarizer laminate, wherein FIG. 7(*a*) is a schematic diagram of the entire station, and FIG. 7(*b*) is a schematic sectional view of a polarizer laminate to be obtained.
Figure 8:
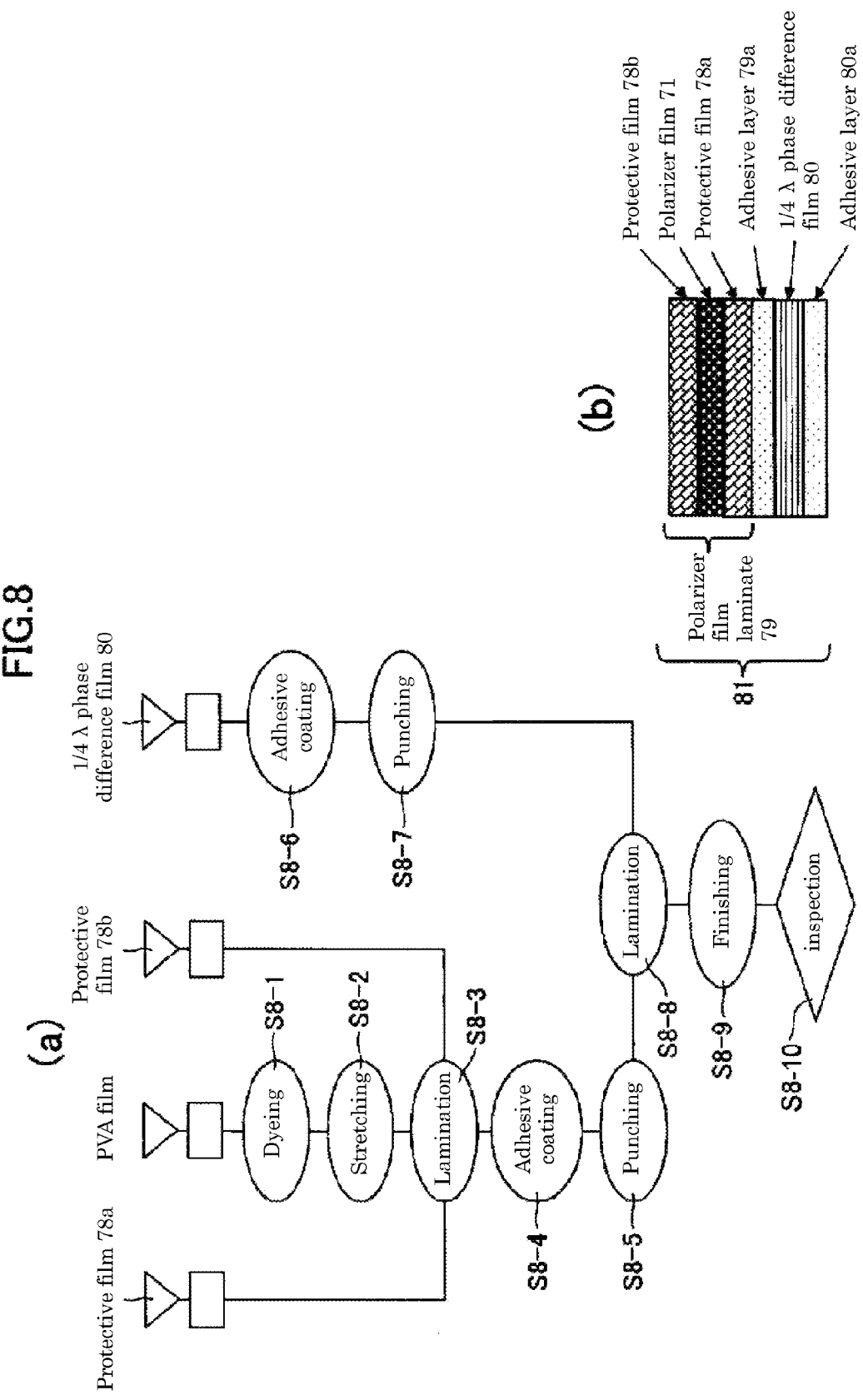
FIGS. 8(*a*) and 8(*b*) illustrate a process of producing a polarization functional laminate, wherein FIG. 8(*a*) is a block diagram of the entire process, and FIG. 8(*b*) is a schematic sectional view of a laminate to be obtained.

A polarization functional laminate usable in the present invention is obtained by laminating the ¼ λ phase difference film formed in the above manner to the polarizer laminate 79 illustrated in FIG. 7(*b*). FIG. 8(*a*) illustrates a process of laminating the polarizer laminate 79 and the ¼ λ phase difference film together. Firstly, a PVA film as a substrate for a polarizer film is formed as the polarizer film 71 illustrated in FIG. 7 via a dyeing step (S8-1) of performing dyeing by iodine and a stretching step (S8-2), and fed to a lamination step (S8-3) of laminating the protective films 78*a*, 78*b* thereto. In the lamination step (S8-3), the protective films 78*a*, 78*b* are laminated, respectively, to opposite surfaces of the polarizer film 71. Then, an adhesive is coatingly applied to one surface of the polarizer film 71 (S8-4). According to need, the polarizer film 71 coated with the adhesive is cut into a size corresponding to a size of an optical unit intended to use the polarizer film 71, for example, by punching (S8-5). In cases where the optical unit is an elongate type prepared in a roll form and used in a station for continuous lamination to display panel boards, this cutting step is omitted.

After subjecting the ¼ λ phase difference film to adhesive coating (S8-6), it is cut into a size corresponding to that of the optical unit (S8-7). In cases where the optical unit is an elongate type prepared in a roll form and used in a station for continuous lamination to display panel boards, this cutting step is omitted, as in the polarizer film laminate 79. The phase difference film cut according to need is laminated to the polarizer film laminate 79 in such a manner that a surface thereof subjected to no adhesive coating is bonded to the laminate 79 through an adhesive layer on the laminate 79. The obtained product is subjected to necessary finishing, such as shaping of edges (S8-9), and transferred to a next station via production inspection (S8-10). FIG. 8(*b*) illustrates an obtained polarization functional laminate 81, wherein the polarizer film laminate 79 is bonded to the ¼ λ phase difference film 80 through the adhesive layer 79*a*. An adhesive layer 80*a* exists on an outer surface of the ¼ λ phase difference film 80. According to need, a release liner (not illustrated) is laminated to the adhesive layer 80*a* on the outer surface of the ¼ λ phase difference film 80. In this polarization functional laminate 81, the polarizer film laminate 79 and the ¼ λ phase difference film 80 are combined in this order when viewed from the viewing side. Thus, the polarization functional laminate 81 has a circularly polarizing function.

(Formation of Touch Panel Laminate)

A basic element layer of the touch panel laminate 3 is composed of a transparent substrate layer, an undercoat layer, an adhesive layer and a transparent electrically conductive layer. A material for forming the substrate layer is not particularly limited, but various types of plastic films having transparency may be employed. For example, the material for the substrate layer includes a polyester-based resin, a acetate-based resin, a polyether sulfone-based resin, a polycarbonate-based resin, a polyamide-based resin, a polyimide-based resin, a polyolefin-based resin, a (meth) acrylic-based resin, a polyvinyl chloride-based resin, a polyvinylidene chloride-based resin, a polystyrene-based resin, a polyvinyl alcohol-based resin, a polyarylate-based resin, and a polyphenylene sulfide-based resin. Among them, a particularly preferable material includes a polyester-based resin, a polycarbonate-based resin, and a polyolefin-based resin. As for the material for the substrate layer, there is a detailed description in the Patent Document 5. While any material described therein may be used, a polyethylene terephthalate (PET) film is commonly used. As a commercially available PET film, there are films produced by Mitsubishi Polyester, Inc. Specifically, two types of films having the same width (1085 mm) and different thicknesses (23 μm and 50 μm) are available. A PET film provided with an oligomer blocking layer for blocking oligomer generated by heat received during a lamination process is available. In a configuration where the touch panel laminate is arranged inside with respect to the polarization functional laminate when viewed from the viewing side, it is preferable that the substrate layer is made of a polycarbonate or norbornene-based resin, instead of PET.

Figure 9:
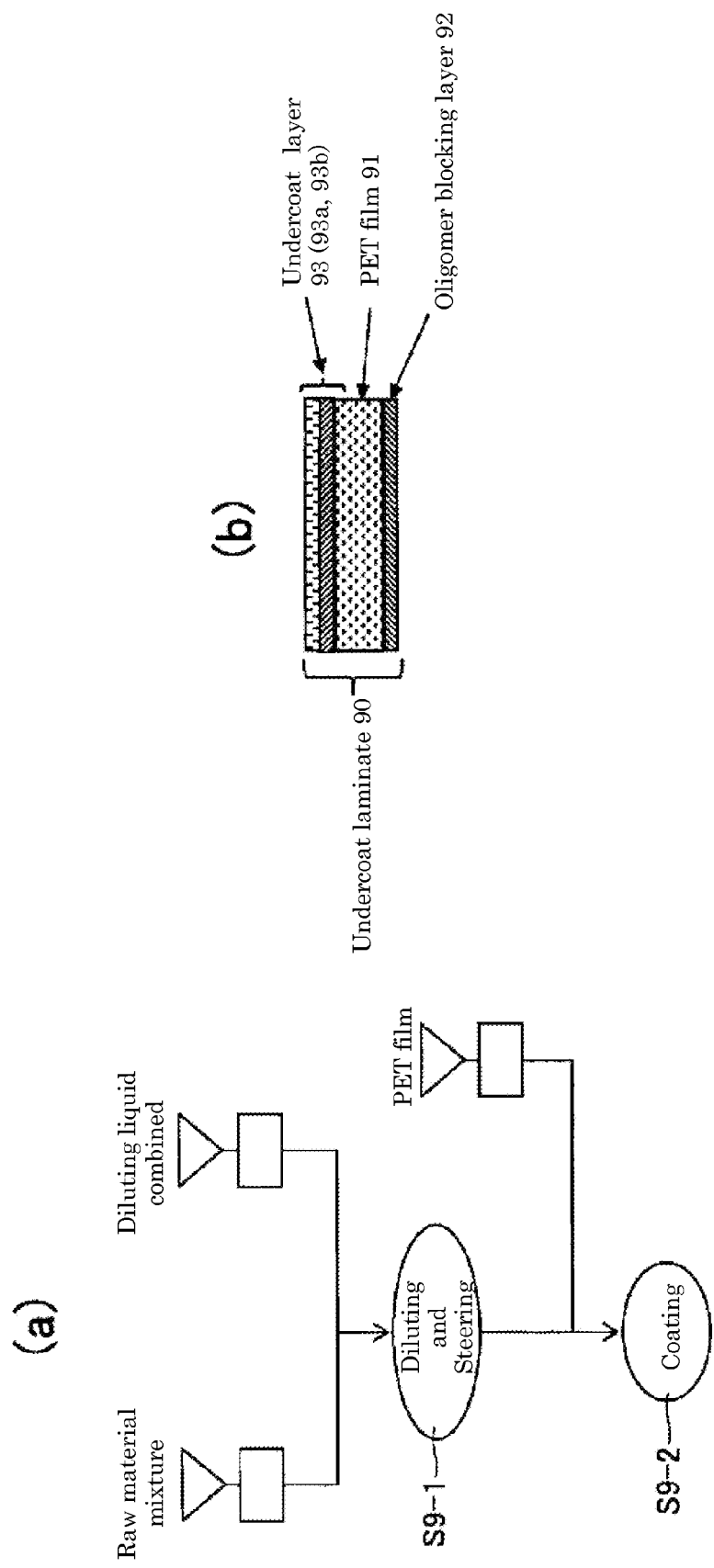
FIGS. 9(*a*) and 9(*b*) illustrate a process of forming an undercoat layer on a substrate as an element layer of a touch panel laminate, wherein FIG. 9(*a*) is a schematic block diagram of the process.

The undercoat layer may be formed by any method described in the Patent Document 5. FIG. 9(*a*) illustrates an undercoat layer coating process. For example, as a material for the undercoat layer, it is possible to use a mixture obtained by mixing a melamine resin, an alkyd resin and an organic silane condensate at a weight ratio of 2:2:1. This mixture contains a solid content at a weight ratio of 30%, and is available from Momentive Performance Materials, Inc., as the trade name "SHC 900". This undercoat raw material mixture is diluted by adding a diluting liquid combined solvent thereto, and the diluted mixture is stirred (S9-1). For example, this solvent may be prepared by mixing cyclopentanone, toluene and methyl ethyl ketone at a weight ratio of 4:3:3. A mixing rate of the solvent is determined to allow a solid content of the undercoat raw material mixture to be set to 1.5 weight %. The diluted undercoat raw material mixture is applied to a surface of the PET film on a side opposite to an oligomer blocking layer preliminarily formed on the other surface thereof (S9-2). Through this process, as illustrated in FIG. 9(*b*), an undercoat laminate 90 is formed which comprises an oligomer blocking layer 92 formed on one surface of a PET film 91, and an undercoat layer 93 formed on the other surface of the PET film 91. According to need, a second undercoat layer may be formed on the undercoat layer 93. In FIG. 9(*b*), the reference codes 93*a*, 93*b* noted in brackets indicate an undercoat formed in a two-layer structure.

Figure 10:
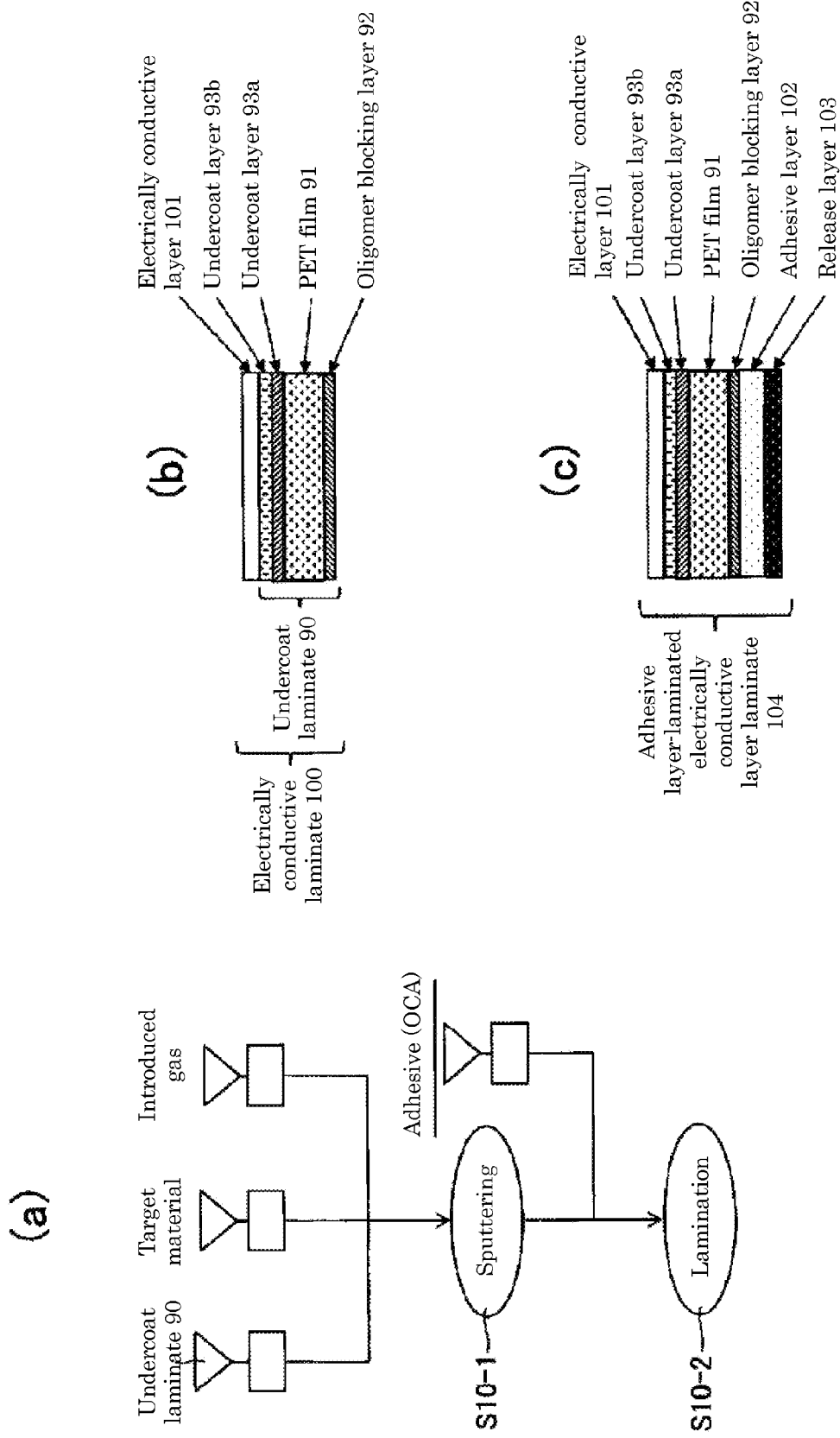

Then, a sputtering process is performed to form the electrically conductive layer on the undercoat laminate 90 obtained in the above manner. FIG. 10(*a*) is a block diagram illustrating one example of the sputtering process. A sputtering target material consisting of 90 weight % of indium oxide and 10 weight % of tin oxide is sputtered against a surface of an outer undercoat layer 93*b* of the undercoat laminate 90 formed by the process in FIG. 9(*a*), in a vacuum atmosphere under a condition that an introduced gas consisting of 98 volume % of argon and 2 volume % of oxygen is excited into a plasma state (S10-1). In this way, an electrically conductive laminate 100 illustrated in FIG. 10(*b*) is obtained in which an electrically conductive layer 101 is formed on the undercoat layer 93*b*. A release liner is laminated to the electrically conductive laminate 100 through an adhesive layer (S10-2). FIG. 10(*c*) illustrates an adhesive layer-laminated electrically conductive layer laminate 104 obtained in this process. As illustrated in FIG. 10(*c*), the adhesive layer-laminated electrically conductive layer laminate 104 has a laminate structure in which the first undercoat layer 93*a* and the second undercoat layer 93*b* are formed on one surface of the substrate layer 91 in this order, wherein the electrically conductive layer 101 is formed on the second undercoat layer 93*b*, and a release liner 103 is bonded to the other surface of the substrate layer 91 on a side opposite to the first undercoat layer 93 through an adhesive layer 102.

Figure 11:
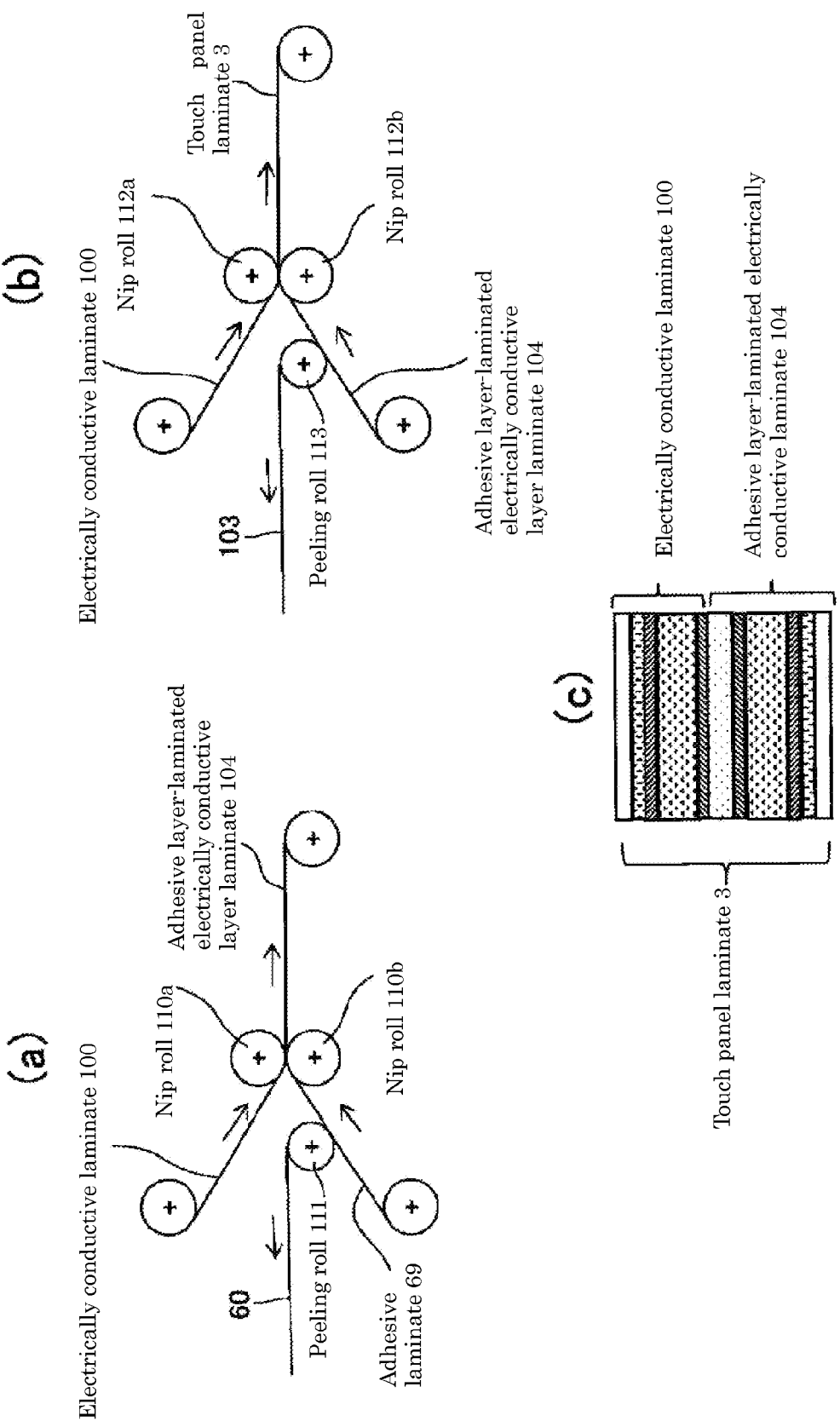
FIGS. 11(a), 11(b) and 11(c) are, respectively, a schematic diagram of a station for forming the electrically conductive layer, a schematic diagram illustrating a station for laminating the adhesive layer-laminated electrically conductive laminate to the electrically conductive laminate, and a sectional view of a touch panel laminate to be obtained.

FIG. 11(a) is a schematic diagram illustrating a station for laminating the adhesive layer 102 in FIG. 10(c). In FIG. 11(a), the electrically conductive laminate 100 and the adhesive laminate 69 formed by the station illustrated in FIG. 6(a) are unrolled, respectively, from their rolls, and fed to pass through between a pair of nip rolls 110a, 110b. The electrically conductive laminate 100 is fed from the roll to allow the oligomer blocking layer 92 to face the adhesive laminate 69. The adhesive laminate 69 is also prepared in the form of a roll, and fed to pass through between the nip rolls 110a, 110b, while peeling the release liner 60 provided on one side by a peeling roll 111 and allowing the exposed adhesive layer 67 to face the electrically conductive laminate 100. In this way, the adhesive layer-laminated electrically conductive layer laminate 104 illustrated in FIG. 10(c) is obtained. This adhesive layer-laminated electrically conductive laminate 104 is wound in a roll form as illustrated in FIG. 11(a). The electrically conductive laminate 100 illustrated in FIG. 10(b) is laminated to the adhesive layer-laminated laminate 104 to form a touch panel laminate 3. FIG. 11(b) is a schematic diagram illustrating a station for the lamination. In FIG. 11(b), the electrically conductive laminate 100 is prepared in the form of a roll. The electrically conductive laminate 100 is unrolled, and fed to pass through a pair of nip rolls 112a, 112b, in a posture where the oligomer blocking layer 92 on the substrate layer 91 is located on a lowermost side. The adhesive layer-laminated electrically conductive laminate 104 is unrolled in a posture where the release liner 103 is located on an uppermost side, and fed to pass through the nip rolls 112a, 112b, while peeling the release liner 103 by a peeling roll 113 and allowing the exposed adhesive layer 102 to face the electrically conductive laminate 100. The laminates 100, 104 are pressed against each other and bonded together by the nip rolls 112a, 112b to form a touch panel laminate. The electrically conductive layers 101 on opposite surfaces of the touch panel laminate are heated and crystallized, for example, by feeding it to pass through a drying oven, and then patterned into a desired pattern by a well-known etching process. The pattering process is well known, as described in detail, for example, in the Patent Document 6, and its detailed description will be omitted here. Through patterning of the electrically conductive layers, the touch panel laminate 3 usable in the optical units illustrated in FIGS. 1 to 4 can be obtained. A cross-section of the touch panel laminate is illustrated in FIG. 11(c).

(Formation of Optical Unit)

Figure 12:
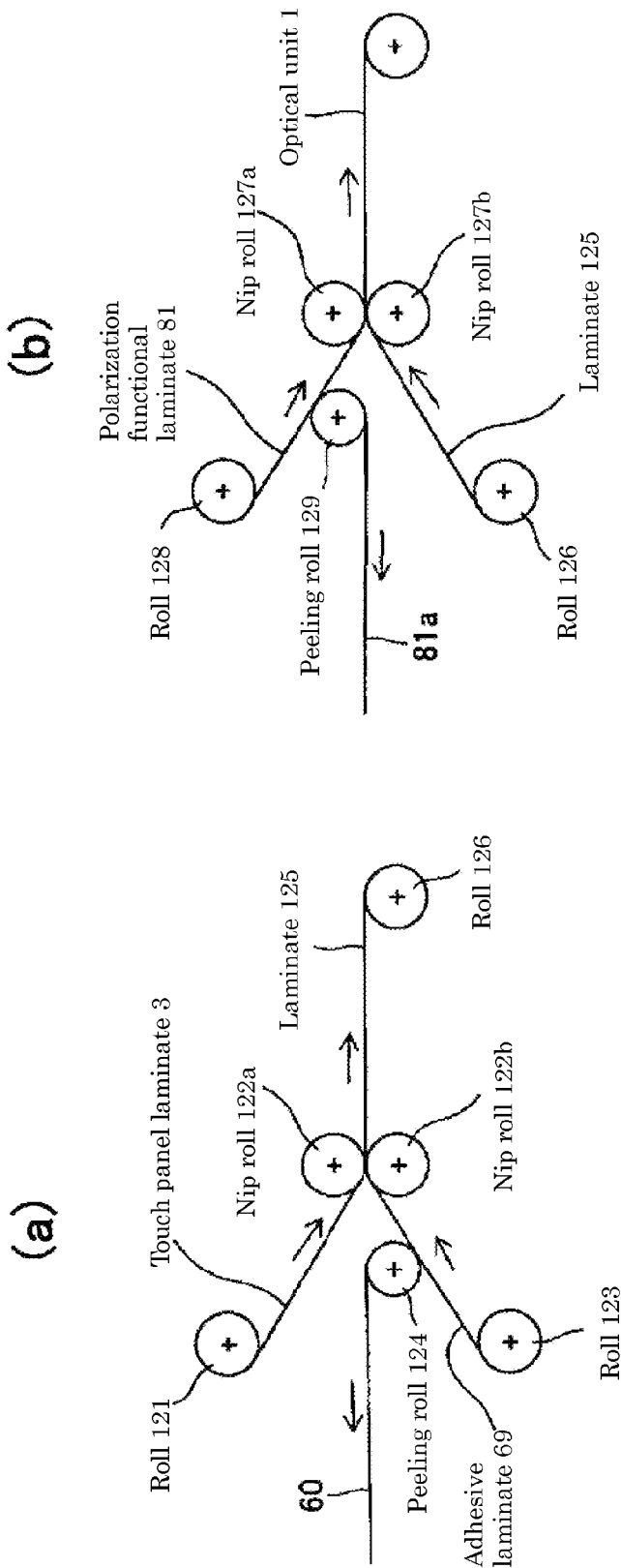

FIGS. 12(a) and 12(b) illustrate a station for laminating the touch panel laminate 3 and the polarization functional laminate 5 together to form the optical unit 1 according to one embodiment in FIG. 2. In a station illustrated in FIG. 12(a), the touch panel laminate 3 is prepared in the form of a roll 121. The touch panel laminate 3 is unrolled from the roll 121 and fed to a nip between a pair of nip rolls 122a, 122b. The adhesive laminate 69 illustrated in FIG. 6(b) is prepared in the form of a roll 123. After the adhesive laminate 69 is unrolled from the roll 123, and the release liner 60 on one side is peeled by a peeling roll 124, it is fed to the nip between the nip rolls 122a, 122b in a posture where the adhesive layer 67 exposed after peeling the release liner 60 faces the touch panel laminate 3. The adhesive layer 67 corresponds to the adhesive layer 9 in the structure illustrated in FIG. 2, and the release liner 63 left without being peeled corresponds to the release liner 11 in the structure illustrated in FIG. 2. The touch panel laminate 3 and the adhesive layer 67 are pressed against each other and bonded together between the nip rolls 122a, 122b to form a laminate 125. This laminate is wound in the form of a roll 126. Then, the laminate 125 is unrolled from the roll 126 and fed to a nip between a pair of nip rolls 127a, 127b in a posture where the exposed electrically conductive layer is located on an uppermost side.

The polarization functional laminate 81 illustrated in FIG. 8(b) is one example in which a release liner 81a is laminated to the adhesive layer 80a, and prepared in the form of a roll 128. The polarization functional laminate 81 is fed to a nip between the pair of nip rolls 127a, 127b, while peeling the release liner 81 by a peeling roll 129, in a posture where the adhesive layer 80a faces the laminate 125. The laminate 125 and the polarization functional laminate 81 are pressed against each other and bonded together by the nip rolls 127a, 127b to form the optical unit 1 illustrated in FIG. 2. In this example, the adhesive layer 80a in laminate 81 corresponds to the adhesive layer 7 of the optical unit 1 in the structure illustrated in FIG. 2, and the polarization functional laminate 81 corresponds to the polarization functional laminate 5 in the structure illustrated in FIG. 2.

When the optical unit 1 illustrated in FIG. 1 is formed, an adhesive layer corresponding to the adhesive layer 7 in the structure illustrated in FIG. 1 is formed on the side of the polarizer film laminate 79, and the polarization functional laminate is bonded to the touch panel laminate 3 through this adhesive layer.

(Lamination of Window or Display Panel Board)

Figure 13:
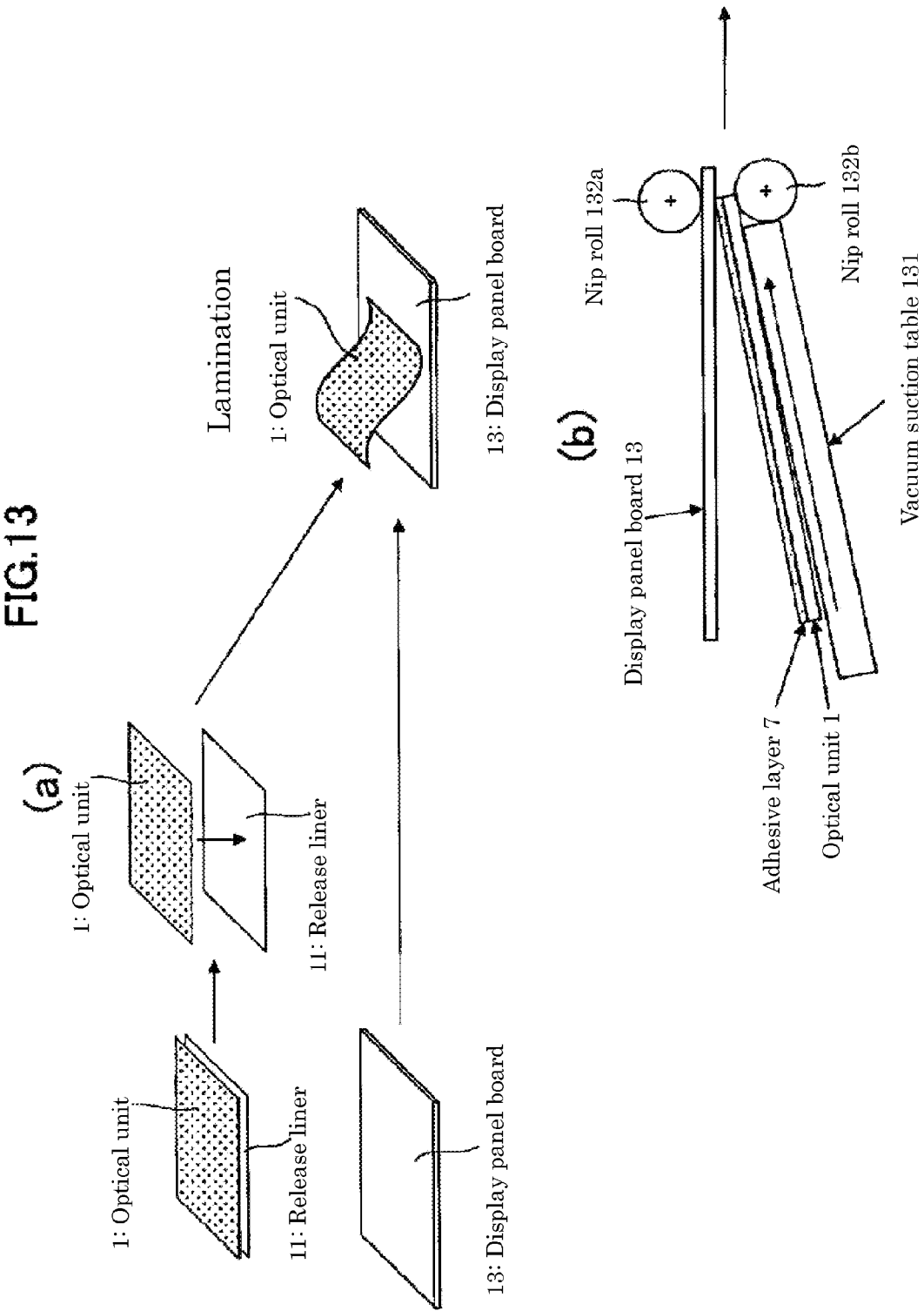

The optical unit 1 formed by the station illustrated in FIG. 12(b) has the layer configuration illustrated in FIG. 2, and a display panel board 13 is bonded to the adhesive layer 9 of the optical unit 1. FIGS. 13(a) and 13(b) illustrate a station for the process, wherein the optical unit 1 is sequentially fed to a lamination position in the form of a sheet of the optical unit 1 cut into a size corresponding to that of the display panel board 13. Each of a plurality of the display panel boards 13 is fed to the lamination position in synchronization with a respective one of a plurality of sheets of the optical units 1. The release liner 11 is peeled from the optical unit 1 just before the lamination position, and the resulting exposed sheet is bonded to a corresponding one of the display panel boards 13. As illustrated in FIG. 13(b), the optical unit 1 is fed to a nip between a pair of nip rolls 132a, 132b in superimposed relation to the display panel board 13, while being suction-held by a vacuum suction table 131 in a posture where the adhesive layer 7 faces the display panel board 13. The optical unit 1 and the display panel board 13 are bonded together through the adhesive layer 7, while passing through the nip between nip rolls 132a, 132b. In the same process, a window 15 can be bonded, over the entire surface thereof, to the polarization functional laminate 5 through a non-illustrated adhesive layer. In a display panel device obtained by the configuration illustrated in FIG. 2, the polarization functional laminate 5 is disposed just below the window 15, so that it is possible to prevent reflected light in an inter-layer interface inward of the polarization functional laminate 5 from getting out of the window 15.

The optical unit 1 illustrated in FIG. 1 can also be laminated to the display panel board 13 and the window 15 by the same process. In this case, the polarization functional laminate 5 is bonded, over the entire surface thereof, to the display panel board 13 through a non-illustrated adhesive layer. The polarization functional laminate 5 prevents reflected light in a surface of the display panel board 13 from getting out of the window 15.

Figure 14:
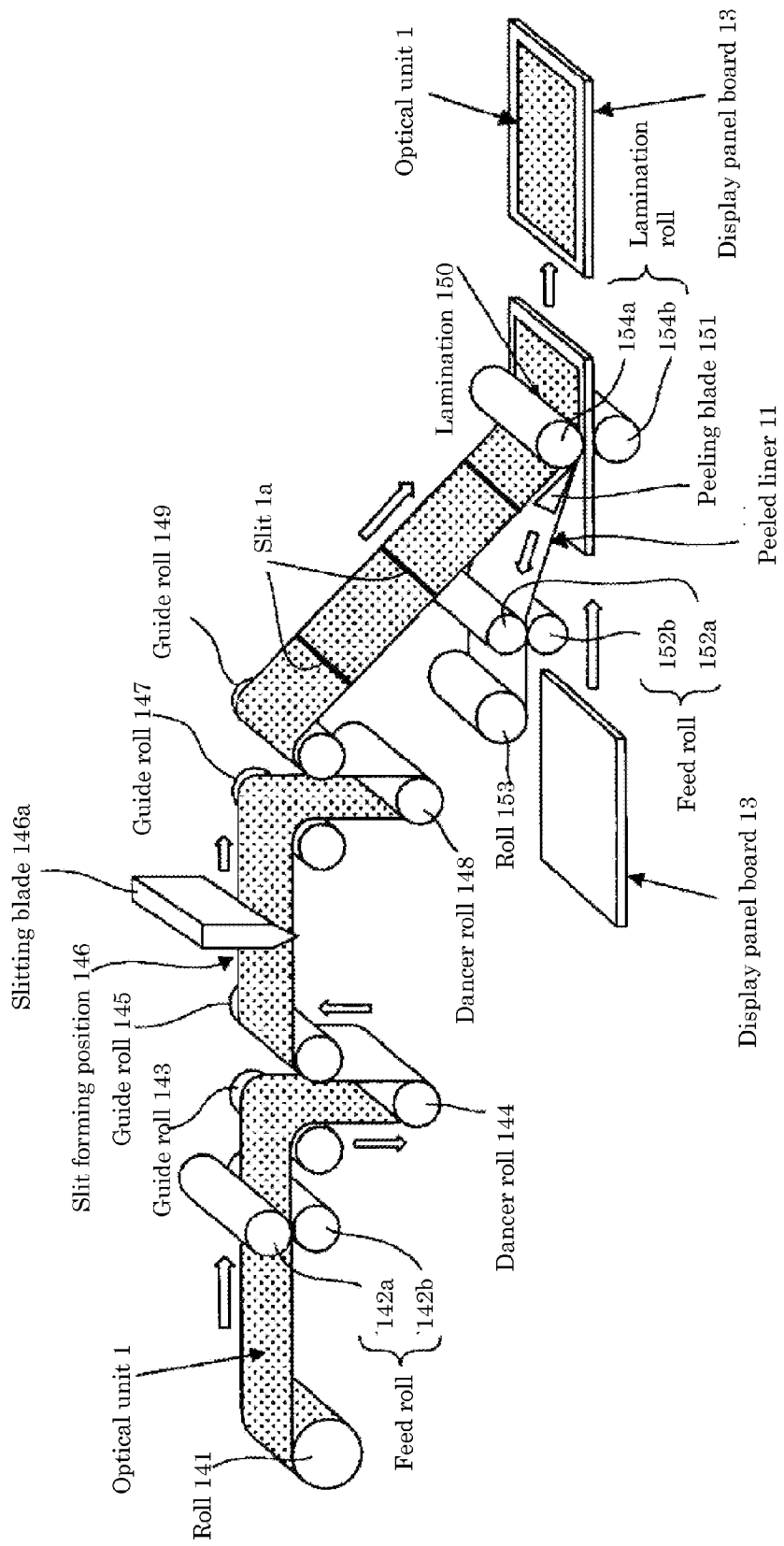
FIG. 14 is a perspective view schematically illustrating a continuous station for bonding the optical unit to a display panel board.

FIG. 14 is a schematic diagram illustrating a system for laminating the optical unit 1 to the display panel board 13 by a continuous process. In this example, the optical unit 1 is formed as an elongate continuous member, and prepared in the formed of a roll 141. The optical unit 1 unrolled from the roll 141 is driven and fed by a pair of feed rolls 142*a*, 142*b*, to a lamination position 150, via a guide roll 143, a dancer roll 144 biased downwardly by a predetermined tensile force in an upwardly and downwardly movable manner, a guide roll 145, a slit forming position 146, a guide roll 147, a dancer roll 148 and a guide roll 149. At the slit forming position 146, a feed of the unit 1 is temporarily stopped, and a slit 1*a* is formed by a slit blade 146*a*, in a width direction of the optical unit 1 at intervals of a distance corresponding to a length or a widthwise dimension of the display panel board 13. Even during a period where the feed of the unit 1 is stopped at the slit forming position, the feed by the rolls 142*a*, 142*b* is continued. Further, during the period, the dancer roll 144 is moved downwardly to automatically adjust a tension of the unit 1 so as to prevent the occurrence of slack thereof. The feed is also continued at the lamination position. In this region, the dancer roll 148 fulfills the adjustment function.

A slitting at the slit forming position is performed from the side of the polarization functional laminate 5 in the structure of the optical unit 1 illustrated in FIG. 2 up to a depth reaching the adhesive layer 9. That is, the release liner 11 is left intact without being cut. In this way, a portion of the optical unit 1 other than the release liner 11 is formed as a plurality of sheet-shaped optical units each cut into a length corresponding to a size of the display panel board 13. In a stage when the slit 1*a* is formed, each sheet of the optical unit 1 is fed together with the release liner 11 while adhering to the release liner 11. Such slitting is called "half cut". The optical unit 1 formed with the slits 1*a* is fed to the lamination position 150, the release liner 11 is folded back at an acute angle by a wedge-shaped peeling blade 151 to allow the sheet of the optical unit 1 to be peeled from the release liner 11. Thus, the adhesive layer 9 is exposed.

A pair of feed rolls 152*a*, 152*b* are provided to wind the peeked release liner 11, so that the release liner 11 is wound as a roll 153. At the lamination position 150, the sheet of the optical unit 1 peeled from the release liner 11 is fed in a feeding direction of the display panel board 13 by a pair of lamination rolls 154*a*, 154*b*. At the lamination position 150, the display panel board 13 is fed in synchronization with the feed of the sheet of the optical unit 1, to pass through a nip between the lamination rolls 154*a*, 154*b* in superimposed relation to the sheet of the optical unit 1. In this way, an optical panel device is formed in which the sheet of the optical unit 1 is bonded to the display panel board 13.

Although the present invention has been particularly shown and described with reference to specific embodiments thereof, it is to be understood that the scope of present invention is not limited to details of the illustrated embodiments, but should be determined by the appended claims and their legal equivalents.

EXPLANATION OF CODES

1: optical unit
3: touch panel laminate
5: polarization functional laminate
7, 9, 31: adhesive layer
11, 13: release liner
13: display panel board
15: window
17: edge print
32, 33: oligomer blocking layer
34, 35: transparent substrate layer
36, 38: undercoat layer
37, 39: transparent electrically conductive layer
51: polarizer film
52: ¼ λ phase difference film

What is claimed is:

1. A roll of an optical unit for producing a display panel device having a capacitive touch input function, said optical unit comprising a combination of a touch panel laminate and a polarization functional laminate, said optical unit being formed in an elongated shape and wound into a roll form;
    wherein:
    the touch panel laminate comprises
        an optically transparent first substrate layer laminated to one surface of an optically transparent adhesive layer,
        a first transparent electrically conductive layer laminated, through a first undercoat layer, to a surface of the first substrate layer on a side opposite to the adhesive layer,
        an optically transparent second substrate layer laminated to the other surface of the adhesive layer, and
        a second transparent electrically conductive layer laminated, through a second undercoat layer, to a surface of the second substrate layer on a side opposite side to the adhesive layer,
        wherein each of the first and second transparent electrically conductive layers is patterned in a predetermined pattern; and
    the polarization functional laminate comprises a layer comprised of at least a circular polarization element, the polarization functional laminate being laminated, through an optically transparent adhesive layer, to one surface of the touch panel laminate on a side having one of the first and second transparent electrically conductive layers,
    wherein the optical unit further comprises a release liner peelably bonded, through an optically transparent adhesive layer, to the other surface of the touch panel laminate on a side having a remaining one of the first and second transparent electrically conductive layers, the adhesive layer bonding the release liner to the touch panel laminate therethrough being adhered to the release liner with a weak peel force enough to be at least partly left on the side of the touch panel laminate in the form of a layer when the release liner is peeled; and
    wherein said touch panel laminate and said polarization functional laminate are bonded together to form an optical unit of an elongated continuous form which is wound into a roll.

2. A roll of an optical unit for producing a display panel device having a capacitive touch input function, said optical unit comprising a combination of a touch panel laminate and a polarization functional laminate, said optical unit being formed in an elongate shape and wound in a roll form;
    wherein:
    the touch panel laminate comprises
        an optically transparent first substrate layer laminated to one surface of an optically transparent adhesive layer,
        a first transparent electrically conductive layer laminated, through a first undercoat layer, to a surface of the first substrate layer on a side opposite to the adhesive layer,
        an optically transparent second substrate layer laminated to the other surface of the adhesive layer, and
        a second transparent electrically conductive layer laminated, through a second undercoat layer, to a surface of the second substrate layer on a side opposite side to the adhesive layer, wherein each of the first and second transparent electrically conductive layers is patterned in a predetermined pattern; and the polarization functional laminate comprises a layer comprised of at least a circular polarization element, the polarization functional laminate being laminated, through an optically transparent adhesive layer, to one surface of the touch panel laminate on a side having one of the first and second transparent electrically conductive layers, wherein said touch panel laminate has a hard coat film bonded thereto through an optically transparent adhesive layer at a surface having the other of said first and second transparent conductive layer, wherein the polarization functional laminate further has a release liner peelably bonded, through an optically transparent adhesive layer, the adhesive layer bonding the release liner to the polarization functional laminate being adhered to the release liner with a weak peel force enough to be at least partly left on the side of the polarization functional laminate; and wherein said touch panel laminate and said polarization functional laminate are bonded together to form an optical unit of an elongated continuous form which is wound into a roll.

3. A roll of an optical unit for producing a display panel device having a capacitive touch input function, said optical unit comprising a combination of a touch panel laminate and a polarization functional laminate, said optical unit being formed in an elongate shape and wound in a roll form;

wherein:

the touch panel laminate comprises an optically transparent first substrate layer laminated to one surface of an optically transparent adhesive layer, a first transparent electrically conductive layer laminated, through a first undercoat layer, to a surface of the first substrate layer on a side opposite to the adhesive layer, an optically transparent second substrate layer laminated to the other surface of the adhesive layer, and a second transparent electrically conductive layer laminated, through a second undercoat layer, to a surface of the second substrate layer on a side opposite side to the adhesive layer, wherein each of the first and second transparent electrically conductive layers is patterned in a predetermined pattern; and the polarization functional laminate comprises a layer comprised of at least a circular polarization element, the polarization functional laminate being laminated, through an optically transparent adhesive layer, to one surface of the touch panel laminate on a side having one of the first and second transparent electrically conductive layers, wherein the polarization functional laminate further comprises a first release liner peelably bonded, through an optically transparent adhesive layer, to a surface having the other of said first and second transparent conductive layers, the adhesive layers bonding the first and second release liners to the polarization functional laminate and the touch panel laminate being adhered to the release liners with a weak peel force enough to be at least partly left on the side of the polarization functional laminate and the touch panel laminate; and wherein said touch panel laminate and said polarization functional laminate are bonded together to form an optical unit of an elongated continuous form which is wound into a roll.

4. The roll of optical unit as defined in claim 1, wherein the polarization functional laminate is comprised of at least a linear polarization element layer and a ¼ λ phase difference layer.

5. The roll of optical unit as defined in claim 2, wherein the polarization functional laminate is comprised of at least a linear polarization element layer and a ¼ λ phase difference layer.

6. The roll of optical unit as defined in claim 3, wherein the polarization functional laminate is comprised of at least a linear polarization element layer and a ¼ λ phase difference layer.

7. A method for producing a display panel comprising steps of;

preparing a roll of an optical unit as defined in claim 1;

feeding display panel units sequentially to a laminating station;

feeding the optical unit from said roll;

cutting said optical unit at a portion excluding said release liner bonded to said touch panel laminate with an interval corresponding to a length in a feeding direction of said display panel unit to form a plurality of sheets of said optical unit, said sheets of optical unit being carried continuously on said release liner bonded to said touch panel laminate;

peeling at the laminating station the sheet of the optical unit from said release liner bonded to said touch panel laminate, and feeding the peeled sheet of the optical unit such that the sheet of the optical unit is faced to the display panel unit at a side of the sheets opposite to the polarization functional laminate; and bonding the sheet of the optical unit to the display panel unit through the adhesive which is remaining on said sheet after the release liner has been peeled off.

8. A method for producing a display panel comprising steps of;

preparing a roll of an optical unit as defined in claim 2;

feeding display panel units sequentially to a laminating station;

feeding the optical unit from said roll;

cutting said optical unit at a portion excluding said release liner bonded to said touch panel laminate with an interval corresponding to a length in a feeding direction of said display panel unit to form a plurality of sheets of said optical unit, said sheets of optical unit being carried continuously on said release liner bonded to said touch panel laminate;

peeling at the laminating station the sheet of the optical unit from said release liner bonded to said touch panel laminate, and feeding the peeled sheet of the optical unit such that the sheet of the optical unit is faced to the display panel unit at a side of the sheets opposite to the polarization functional laminate; and bonding the sheet of the optical unit to the display panel unit through the adhesive which is remaining on said sheet after the release liner has been peeled off.

9. A method for producing a display panel comprising steps of;

preparing a roll of an optical unit as defined in claim 3;

feeding display panel units sequentially to a laminating station;

feeding the optical unit from said roll;

cutting said optical unit at a portion excluding said release liner bonded to said touch panel laminate with an interval corresponding to a length in a feeding direction of said display panel unit to form a plurality of sheets of said optical unit, said sheets of optical unit being carried continuously on said release liner bonded to said touch panel laminate;

peeling at the laminating station the sheet of the optical unit from said release liner bonded to said touch panel laminate, and feeding the peeled sheet of the optical unit such that the sheet of the optical unit is faced to the display panel unit at a side of the sheets opposite to the polarization functional laminate; and bonding the sheet of the optical unit to the display panel unit through the adhesive which is remaining on said sheet after the release liner has been peeled off.

10. A method for producing a display panel comprising steps of;

preparing a roll of an optical unit as defined in claim 1;

feeding display panel units sequentially to a laminating station;

feeding the optical unit from said roll;

cutting said optical unit at a portion excluding said release liner bonded to said polarization functional laminate with an interval corresponding to a length in a feeding direction of said display panel unit to form a plurality of sheets of said optical unit, said sheets of optical unit being carried continuously on said release liner bonded to said polarization functional laminate;

peeling at the laminating station the sheet of the optical unit from said release liner bonded to said polarization functional laminate, and feeding the peeled sheet of the optical unit such that the sheet of the optical unit is faced to the display panel unit at a side of the polarization functional laminate; and bonding the sheet of the optical unit to the display panel unit through the adhesive which is remaining on said sheet after the release liner has been peeled off.

11. A method for producing a display panel comprising steps of;

preparing a roll of an optical unit as defined in claim 2;

feeding display panel units sequentially to a laminating station;

feeding the optical unit from said roll;

cutting said optical unit at a portion excluding said release liner bonded to said polarization functional laminate with an interval corresponding to a length in a feeding direction of said display panel unit to form a plurality of sheets of said optical unit, said sheets of optical unit being carried continuously on said release liner bonded to said polarization functional laminate;

peeling at the laminating station the sheet of the optical unit from said release liner bonded to said polarization functional laminate, and feeding the peeled sheet of the optical unit such that the sheet of the optical unit is faced to the display panel unit at a side of the polarization functional laminate; and bonding the sheet of the optical unit to the display panel unit through the adhesive which is remaining on said sheet after the release liner has been peeled off.

12. A method for producing a display panel comprising steps of:

preparing a roll of an optical unit as defined in claim 3;

feeding display panel units sequentially to a laminating station;

feeding the optical unit from said roll;

cutting said optical unit at a portion excluding said release liner bonded to said polarization functional laminate with an interval corresponding to a length in a feeding direction of said display panel unit to form a plurality of sheets of said optical unit, said sheets of optical unit being carried continuously on said release liner bonded to said polarization functional laminate;

peeling at the laminating station the sheet of the optical unit from said release liner bonded to said polarization functional laminate, and feeding the peeled sheet of the optical unit such that the sheet of the optical unit is faced to the display panel unit at a side of the polarization functional laminate; and bonding the sheet of the optical unit to the display panel unit through the adhesive which is remaining on said sheet after the release liner has been peeled off.

* * * * *